(12) United States Patent
Oda et al.

(10) Patent No.: US 8,130,431 B2
(45) Date of Patent: Mar. 6, 2012

(54) OPTICAL SCANNING APPARATUS AND IMAGE FORMING APPARATUS

(75) Inventors: Ayumu Oda, Osaka (JP); Nobuhiro Shirai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 161 days.

(21) Appl. No.: 12/552,390

(22) Filed: Sep. 2, 2009

(65) Prior Publication Data

US 2010/0060965 A1 Mar. 11, 2010

(30) Foreign Application Priority Data

Sep. 8, 2008 (JP) ................................ 2008-230037

(51) Int. Cl.
*G02B 26/08* (2006.01)
(52) U.S. Cl. .................................................. 359/196.1
(58) Field of Classification Search .... 359/196.1–226.3; 250/204, 559.06, 559.29, 230, 234; 347/255–260; 353/39, 98–99
See application file for complete search history.

(56) References Cited

U.S. PATENT DOCUMENTS 7,474,451 B2 1/2009 Yamakawa et al.

FOREIGN PATENT DOCUMENTS

JP 62-269925 11/1987

(Continued)

*Primary Examiner* — Jennifer L. Doak
(74) *Attorney, Agent, or Firm* — Renner, Otto, Boisselle & Sklar, LLP

(57) ABSTRACT

In one embodiment of an optical scanning apparatus, a light blocking member is provided that is disposed facing a reflective face of a polygon mirror near the reflective face, and blocks stray light without blocking light in an effective scanning range of a laser beam. The light blocking member includes a light blocking plate having an opposing face that faces the reflective face of the polygon mirror, a support plate that supports the light blocking plate, and a fixing plate that fixes the lower edge portion of the support plate to a support member. The opposing face of the light blocking plate is inclined relative to the reflective face of the polygon mirror, and a space below the light blocking plate is open.

10 Claims, 16 Drawing Sheets

FOREIGN PATENT DOCUMENTS

| JP | 2001-004947 | | 1/2001 |
| JP | 2002196269 A | * | 7/2002 |
| JP | 2006-178130 | | 7/2006 |
| JP | 2006-293267 | | 10/2006 |

* cited by examiner

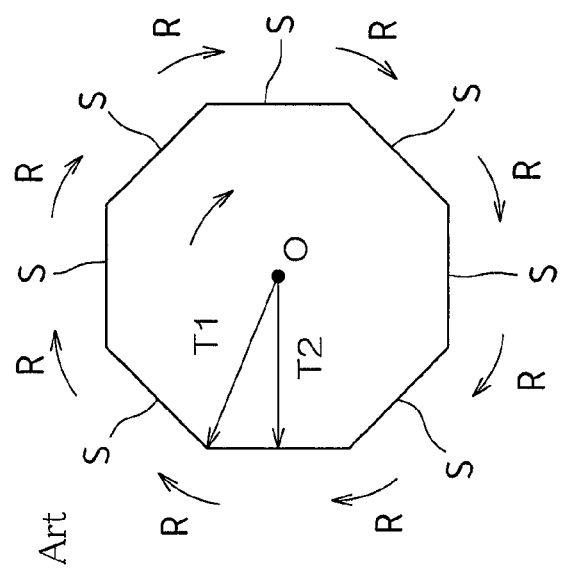
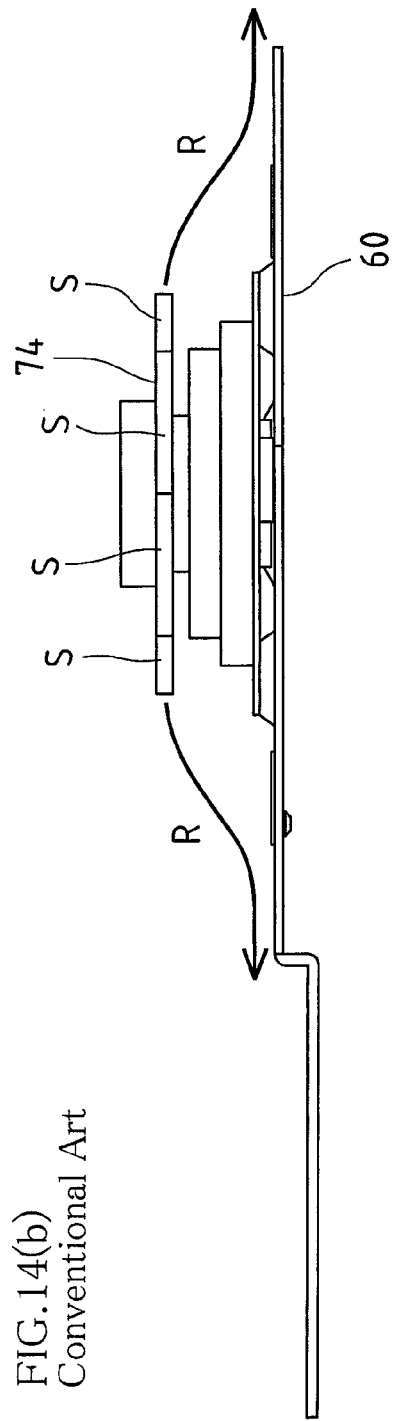
FIG.14(a) Conventional Art
FIG.14(b) Conventional Art

OPTICAL SCANNING APPARATUS AND IMAGE FORMING APPARATUS

CROSS-REFERENCE TO RELATED APPLICATIONS

This application claims priority under 35 U.S.C. §119(a) on Patent Application No. 2008-230037 filed in Japan on Sep. 8, 2008, the entire contents of which are herein incorporated by reference.

BACKGROUND OF THE INVENTION

1. Field of the Invention

The present invention relates to an optical scanning apparatus provided with a light blocking member that blocks other light without blocking the light in an effective scanning range of a laser beam, and also relates to an electrophotographic image forming apparatus such as a copying machine, a printer, or a facsimile machine provided with that optical scanning apparatus.

2. Related Art

In an electrophotographic image forming apparatus of this type, while scanning the surface of a photosensitive body with a laser beam, the intensity of the laser beam is controlled to write a latent image of an image, text, or the like to the surface of the photosensitive body line by line (main scanning line), the latent image on the surface of the photosensitive body is developed using toner to form a toner image on the surface of the photosensitive body, and the toner image on the surface of the photosensitive body is transferred to a recording paper.

An optical scanning apparatus is used for projection of a laser beam. This optical scanning apparatus is provided with a semiconductor laser that emits a laser beam, a rotating polygon mirror that reflects the laser beam from the semiconductor laser to deflect/scan that light, and a plurality of lenses that refract the laser beam that is deflected/scanned by the rotating polygon mirror. The optical scanning apparatus converges and projects the laser beam that is deflected/scanned onto the surface of the photosensitive body via the lenses. While the laser beam is repeatedly scanned in a main scanning direction on the surface of the photosensitive body, the surface of the photosensitive body is moved in a sub scanning direction, so that a latent image is formed on the surface of the photosensitive body.

Ordinarily, a plurality of lenses are provided in the light path of the laser beam from the semiconductor laser to the surface of the photosensitive body, and among the lenses is included an fθ lens, a toroidal lens, or the like. An fθ lens corrects a laser beam that is reflected by the rotating polygon mirror and moves at an equiangular velocity so as to move at a constant velocity on the surface of the photosensitive body. A toroidal lens corrects the light beam of the laser beam to the sub scanning direction.

In an optical scanning apparatus having such a configuration, the laser beam that has been reflected by one reflective face (mirror face) of the rotating polygon mirror is converged and projected onto the surface of the photosensitive body via the plurality of lenses, but at this time, there is the problem that some of the light reflected at the lens surface strays and is again incident on the rotating polygon mirror.

Incidentally, a rotating polygon mirror having six faces is often used in conventional optical scanning apparatuses. In a rotating polygon mirror having six faces, a large angle of 60 degrees is formed by a reflective face that is adjacent to one reflective face in the tangential direction, so even if the laser beam that has been reflected at one reflective face of the rotating polygon mirror is reflected at a lens surface, and strays and is incident on an adjacent reflective face, the stray light reflected at this reflective face proceeds in a direction outside of the effective scanning range of the scanned laser beam (i.e., a direction other than on the surface of the photosensitive body), so there is little need to worry about stray light.

However, recently, rotating polygon mirrors having eight faces have come into use in order to increase the number of revolutions in which it is possible to scan with the same rotational speed, thereby accelerating formation of the latent image on the surface of the photosensitive body. In this case, with a rotating polygon mirror having eight faces, an angle of 45 degrees is formed by a reflective face that is adjacent to one reflective face in the tangential direction, which is 15 degrees smaller than in the case of a rotating polygon mirror having six faces, so when a laser beam that has been reflected at one reflective face of the rotating polygon mirror is reflected at a lens surface, and strays and is incident on an adjacent reflective face, the stray light reflected at this reflective face proceeds in a direction within the effective scanning range of the scanned laser beam (i.e., in the direction of the surface of the photosensitive body), so there is the problem that the stray light affects formation (exposure) of an electrostatic latent image.

Here, problems related to stray light due to using a rotating polygon mirror having eight faces will be described in detail with reference to FIGS. 11 and 12.

FIG. 11 shows how this sort of stray light is incident on a rotating polygon mirror having eight faces. FIG. 12 shows, over time, how one laser beam fired from one light source is reflected by one reflective face of a rotating polygon mirror having eight faces and is deflected/scanned. In FIG. 12, in order to simplify the description, by way of example, three scanning laser beams L2$a$, L2$b$, and L2$c$ that move over time are shown.

That is, an incident laser beam L1 from a light source incident on one reflective face (mirror face) S1 of a rotating polygon mirror 74 is reflected by that reflective face S1 to become a scanning laser beam L2 (L2$a$, L2$b$, L2$c$), and is converged (indicated by time-series convergence points a, b, and c) and projected onto the surface (image face) 301 of a photosensitive drum 3 via a first fθ lens 75 and a second fθ lens 77. On the other hand, part of a laser beam reflected by the surface of the second fθ lens 77 becomes stray light L3 (L3$a$, L3$b$, L3$c$), is incident (indicated by time-series incidence points a, b, and c) on a reflective face (mirror face) S2 adjacent to the reflective face (mirror face) S1 of the rotating polygon mirror 74, is again reflected by that reflective face S2 to become a reflected laser beam L4 (L4$a$, L4$b$, L4$c$, . . . ), and is converged (indicated by time-series convergence points a', b', and c') as unnecessary stray light on the surface 301 of the photosensitive drum 3 (referred to below as a photosensitive body surface) by again passing through the first fθ lens 75 and the second fθ lens 77. That is, the one incident laser beam L1 also scans other scanning positions (other convergence points a', b', and c' on the photosensitive body surface 301 shown in FIG. 12) different from the proper scanning positions (convergence points a, b, and c on the photosensitive body surface 301 shown in FIG. 12). The scanning positions on the photosensitive body surface 301 due to this stray light are about 45 to 50 mm in terms of image height. Incidentally, the image height (i.e., the width of an effective scanning region W0 on the photosensitive body surface 301) of the entire photosensitive drum 3 is about 220 mm.

Here, because the transmittance of each lens is about 90 to 95%, it is possible that up to about 10% of the scanning laser beam L2 (L2a, L2b, and L2c) will be incident as stray light on the reflective face S2 of the rotating polygon mirror 74. In this case, although the amount of stray light itself is small, when that stray light is converged within the effective scanning region W0 of the photosensitive body surface 301, formation of an electrostatic latent image is significantly affected. Therefore, it is necessary to block stray light well enough that formation of an electrostatic latent image is not affected. Consequently, there have been proposals in the conventional technology for an optical scanning apparatus in which a light blocking member for blocking stray light near a rotating polygon mirror is disposed (e.g., see JP S62-269925A (referred to below as 'Patent Document 1')).

In the optical scanning apparatus described in Patent Document 1, a light blocking member is vertically disposed between a rotating polygon mirror and a first fθ lens, near the rotating polygon mirror. This light blocking member is formed in an arc shape when viewed from above, with the rotational center of the rotating polygon mirror as its center, and both end portions of the light blocking member are disposed close to corner portions at both ends of one reflective face of the rotating polygon mirror. Also, although not described in Patent Document 1, this light blocking member is disposed standing perpendicular to a support member that rotatably supports the rotating polygon mirror.

In this case, because it is necessary for the light blocking member to block only stray light, and not block the effective scanning range of the laser beam reflected by the rotating polygon mirror, it is necessary for the light blocking member to be disposed as close to the rotating polygon mirror as possible.

FIG. 13 illustrates the optimal disposed position of the light blocking member.

As shown in FIG. 12, the stray lights L3a, L3b, and L3c that are incident on the reflective face (mirror face) S2 of the rotating polygon mirror 74 move in the manner of incidence points a, b, and c with the passage of time. Here, in FIG. 13, a range D indicated by a solid line is the effective scanning range (the range in which the effective scanning region W0 in a main scanning direction X of the photosensitive body surface 301 can be scanned), and light must not be blocked in this effective scanning range D. Accordingly, in order to not block light in the effective scanning range D, and also reliably block stray light, a light blocking member 161 may be disposed at a position separated by W1 in FIG. 13. However, with the light blocking member 161 disposed at this position, when the rotating polygon mirror 74 rotates to the position indicated by the double-dotted chained line in FIG. 13, there is a possibility that the corner (portion bordering the adjacent reflective face) of the rotating polygon mirror 74 will make contact with the light blocking member 161, so it difficult in practice to dispose the light blocking member 161 at the position separated by W1.

On the other hand, it is not absolutely necessary to block 100% of stray light; there is no problem if some amount of stray light reaches the photosensitive body surface 301 as long as that amount of stray light does not affect formation of an electrostatic latent image. More specifically, if about 50 to 80% of the stray light can be blocked, formation of an electrostatic latent image will not be affected. Consequently, in order to not block light in the effective scanning range D, and also reliably block stray light such that the stray light does not affect formation of an electrostatic latent image, the light blocking member 161 may be disposed at a position separated by W2 in FIG. 13. With the light blocking member 161 disposed at this position, it is possible to block stray light such that the stray light does not affect formation of an electrostatic latent image, and there is no worry that a corner of the rotating polygon mirror 74 will make contact with the light blocking member 161 when turning. Note that, in consideration of preventing contact of the rotating polygon mirror 74 and the light blocking member 161, it is also conceivable to dispose the light blocking member 161 at a position separated by W3 in FIG. 13, but when the light blocking member 161 is disposed at this position, the percentage of stray light that is blocked decreases (e.g., decreases to about 30%), and so the amount of stray light that reaches the photosensitive body surface 301 without being blocked increases. Therefore, there is a possibility that formation of an electrostatic latent image will be affected. Incidentally, the distance W2 in FIG. 13 is about 3 to 5 mm.

On the other hand, there is the problem that when the light blocking member is disposed near a reflective face of the rotating polygon mirror (disposed at the position separated by W2 in FIG. 13), because the rotating polygon mirror rotates at high speed (specifically, about 40,000 rpm), the light blocking member 161 disposed near the rotating polygon mirror 74 vibrates, producing high-pitched noise.

That is, in the rotating polygon mirror 74, as shown in FIG. 14(a), distances T from a rotational center O to a reflective face S of the rotating polygon mirror 74 differ between the parts of the reflective face S. A distance T1 from the rotational center O to each corner of the reflective face S, which are portions that border an adjacent reflective face S, is the longest distance, and a distance T2 from the rotational center O to the center point of the reflective face S is the shortest distance.

When the rotating polygon mirror 74 having such a shape rotates at high speed, as shown in FIG. 14(a), this rotation of the rotating polygon mirror 74 is accompanied by rotation of the surrounding air in a donut shape so as to draw a circle in the same direction (in the drawings, arrow R indicates the flow of air). This flow of air (airflow) R, when viewed in the vertical direction, as shown in FIG. 14(b), flows downward, and flows along the surface of a support member 60 of the rotating polygon mirror 74 and expands into the surrounding area.

When, as in above Patent Document 1, the light blocking member 161 is provided standing near the rotating polygon mirror 74, which causes this sort of airflow, a shortest distance T11 between the light blocking member 161 and the rotating polygon mirror 74 occurs when a corner of a reflective face S of the rotating polygon mirror 74 is facing an opposing face 161a of the light blocking member 161, as shown in FIG. 15(a), and a longest distance T12 between the light blocking member 161 and the rotating polygon mirror 74 occurs when a reflective face S of the rotating polygon mirror 74 is facing the opposing face 161a of the light blocking member 161 so as to be parallel, as shown in FIG. 15(b). Accordingly, when the rotating polygon mirror 74 rotates at high speed, periodically with that high speed rotation, the distance between the opposing face 161a of the light blocking member 161 and a reflective face S of the rotating polygon mirror 74 repeats between near (distance T11) and far (distance T12). Therefore, the air (airflow) R that flows between the opposing face 161a of the light blocking member 161 and a reflective face S of the rotating polygon mirror 74 repeatedly is in a sparse/dense state depending on whether a reflective face S of the rotating polygon mirror 74 is near or far from the light blocking member 161. Also, as shown in FIG. 15(c), when the light blocking member 161 is provided standing vertically on the support member 60, air that attempts to flow to the outside and downward is directly stopped by the vertical face of the light blocking member 161, so the flow of air is completely prevented, and a large air pressure is applied to the light blocking member 161. Due to such a large air pressure, and the repeating sparse/dense state of the airflow described above, the light blocking member 161 vibrates, causing a high-pitched vibration noise.

Vibration noise that is comparatively low-pitched, such as motor revolution noise, does not sound particularly harsh to human ears, but high-pitched vibration noise sounds very harsh to human ears. Therefore, when using an optical scanning apparatus in which a light blocking member is disposed near a rotating polygon mirror, as with the conventional technology, there is the problem that high-pitched noise causes discomfort to a user.

SUMMARY OF THE INVENTION

The present invention provides an optical scanning apparatus in which a light blocking member is disposed near a rotating polygon mirror, and along with reliably blocking stray light, it is possible to reliably prevent the occurrence of high-pitched vibration noise due to disposing the light blocking member near the rotating polygon mirror. The present invention also provides an image forming apparatus having this optical scanning apparatus.

An optical scanning apparatus of the present invention includes: a light source that irradiates a laser beam; a rotating polygon mirror that deflects and scans a laser beam from the light source; and a light blocking member that is disposed facing a reflective face of the rotating polygon mirror, and blocks other light without blocking light in an effective scanning range of the laser beam; wherein an opposing face of the light blocking member that faces the reflective face of the rotating polygon mirror is inclined.

When, as in the description of the conventional technology, a light blocking member is provided perpendicular to a support member, air that attempts to flow to the outside and downward is completely stopped by the vertical face of the light blocking member, so the flow of air is completely prevented. However, as in the present invention, by inclining the opposing face of the light blocking member that faces the reflective face of the rotating polygon mirror, the airflow flows along this inclined face and is not completely prevented, so a large air pressure is not applied to the light blocking member. Accordingly, even if a sparse/dense state of air occurs between the light blocking member and the reflective face of the rotating polygon mirror, the air pressure on the light blocking member is reduced, so it is possible to reduce vibration of the light blocking member. Therefore, even if vibration noise occurs, that noise is comparatively low-pitched, and the amount of vibration noise is smaller than in the case of the conventional technology, so the user is not made uncomfortable.

In this case, it is preferable that when a support member side where the rotating polygon mirror is rotatably attached and supported is defined as a lower side, and a side where the rotating polygon mirror is disposed relative to this support member is defined as an upper side, the opposing face of the light blocking member inclines downward from an upper edge of the opposing face nearest to the reflective face of the rotating polygon mirror so that the distance from the reflective face becomes wider downward. As in the above description of the conventional technology, the airflow that occurs due to high speed rotation of the rotating polygon mirror flows downward. Therefore, by inclining the opposing face of the light blocking member to follow the flow of this airflow, the flow of this airflow is not greatly changed, so it is possible to suppress the pressure received from the airflow to a minimum.

Also, in the present invention, a convention may be adopted in which the light blocking member includes: a light blocking plate having the opposing face; a support plate that supports the light blocking plate; and a fixing plate that fixes a lower edge portion of the support plate to the support member; the space below the light blocking plate being open due to the light blocking plate being supported in a cantilever manner by the support plate. More specifically, the support plate of the light blocking member may be provided at a position that is offset in the rotational direction relative to a parallel axis that passes through a rotational center of the rotating polygon mirror and is parallel to a laser irradiation direction when irradiating a laser beam to the center in a main scanning direction of a photosensitive body surface. As in the above description of the conventional technology, airflow that occurs due to high speed rotation of the rotating polygon mirror flows downward, and flows along the support member so as to expand into the surrounding area. Therefore, by opening the space below the light blocking plate, air that has flowed downward along the light blocking plate is afterward not obstructed by the light blocking plate, and therefore able to smoothly flow to the outside via the opening below the light blocking plate. Thus, it is possible to further suppress the pressure received by the light blocking member from the airflow.

Also, in the present invention, a lateral edge portion of the light blocking plate, the lateral end being a receiving side of airflow that occurs due to rotation of the rotating polygon mirror, may be thinly formed so as to reduce resistance of that airflow. Specifically, an outside face of the lateral edge portion of the light blocking plate may be formed in a so-called wedge shape, provided inclined relative to the flow of the airflow. By adopting such a configuration, the airflow that occurs in the rotational direction along with high speed rotation of the rotating polygon mirror can be cut with the lateral edge portion of the light blocking plate and released, so a large air pressure is not applied to the light blocking plate by the airflow that occurs in the rotational direction.

Also, in the present invention, it is preferable that the light blocking member is formed from a material that does not plastically deform due to external force. By adopting a sturdy configuration for the light blocking member itself, even if high speed airflow that occurs due to high speed rotation of the rotating polygon mirror is received, there is not a large amount of vibration, so the vibration noise that occurs is low-pitched noise and can be made small, so it is possible to suppress vibration noise to the extent that there is no discomfort to the user.

Also, in the present invention, a configuration may be adopted in which a back face (outside face) of the opposing face of the light blocking plate is also inclined. By also inclining the outside face, stray light that has returned towards the reflective face of the rotating polygon mirror can be reflected by the outside face of the light blocking plate in a completely different direction than the direction of the scanning laser beam, so the likelihood that this reflected stray light will again return to the reflective face of the polygon mirror can be greatly reduced. That is, it is possible to further increase the light blocking effect.

Also, in the present invention, the light blocking member may be formed from a material of a color having low reflectivity. By forming the light blocking member from a material of a color having low reflectivity, most of stray light that has returned towards the reflective face of the rotating polygon mirror can be absorbed (extinguished) by the light blocking member. Thus, even if part of the stray light that has returned has been reflected, the likelihood that this reflected stray light will again return to the reflective face of the rotating polygon mirror can be greatly reduced. That is, it is possible to further increase the light blocking effect.

Also, in the present invention, a face (outside face) on the opposite side as the opposing face of the light blocking member may be formed with a surface roughness that disperses the laser beam. By forming the outside face of the light blocking member with a surface roughness that disperses the laser beam, stray light that has returned towards the reflective face of the rotating polygon mirror can be reflected in a dispersed manner by the outside face of the light blocking plate. Thus, the likelihood that the stray light reflected in a dispersed manner will again return to the reflective face of the rotating polygon mirror can be greatly reduced. That is, it is possible to further increase the light blocking effect.

Also, according to the optical scanning apparatus with the above configuration, a light blocking member is configured with a light blocking plate having an opposing face that faces a reflective face of a rotating polygon mirror, a support plate that supports the light blocking plate, and a fixing plate that fixes the lower edge portion of the support plate to a support member. That is, a structure is adopted in which the light blocking member is attached and fixed to the support member of the rotating polygon mirror. However, the optical scanning apparatus may further include a cover member that covers the entire rotating polygon mirror from above. Accordingly, in an optical scanning apparatus having such a cover member, a configuration may be adopted in which the light blocking member includes a light blocking plate having an opposing face that faces the reflective face of the rotating polygon mirror, and a support plate that supportably fixes the light blocking plate to the cover member. By adopting a structure in which, in this way, the light blocking member is supportably fixed from above the rotating polygon mirror, it is possible to open the entire space below the light blocking member, and so it is possible to release the downward airflow that occurs due to high speed rotation of the rotating polygon mirror, without any obstruction of that airflow at all. Thus, it is possible to further reduce the occurrence of vibration noise due to vibration of the light blocking member. Furthermore, by forming the light blocking member as a single body with the cover member, it is possible to reduce the number of components, and also possible to reduce manufacturing costs.

Because the present invention is configured as described above, with the light blocking member it is possible to reliably block light other than a scanning laser beam without blocking light in the effective scanning range, and possible to prevent the occurrence of high-pitched vibration noise due to disposing the light blocking member near the rotating polygon mirror. Thus, there is no discomfort to the user due to high-pitched vibration noise.

BRIEF DESCRIPTION OF THE DRAWINGS

FIG. 10($a$) is a cross-sectional view from the direction of arrow m in FIG. 9, and FIG. 10($b$) is a cross-sectional view from the direction of arrow n in FIG. 9.

FIGS. 14($a$) and 14($b$) illustrate a flow of air (airflow) that occurs due to high speed rotation of a polygon mirror.

DESCRIPTION OF THE PREFERRED EMBODIMENTS

Hereinafter, embodiments of the present invention will be described with reference to the drawings.

Figure 1:
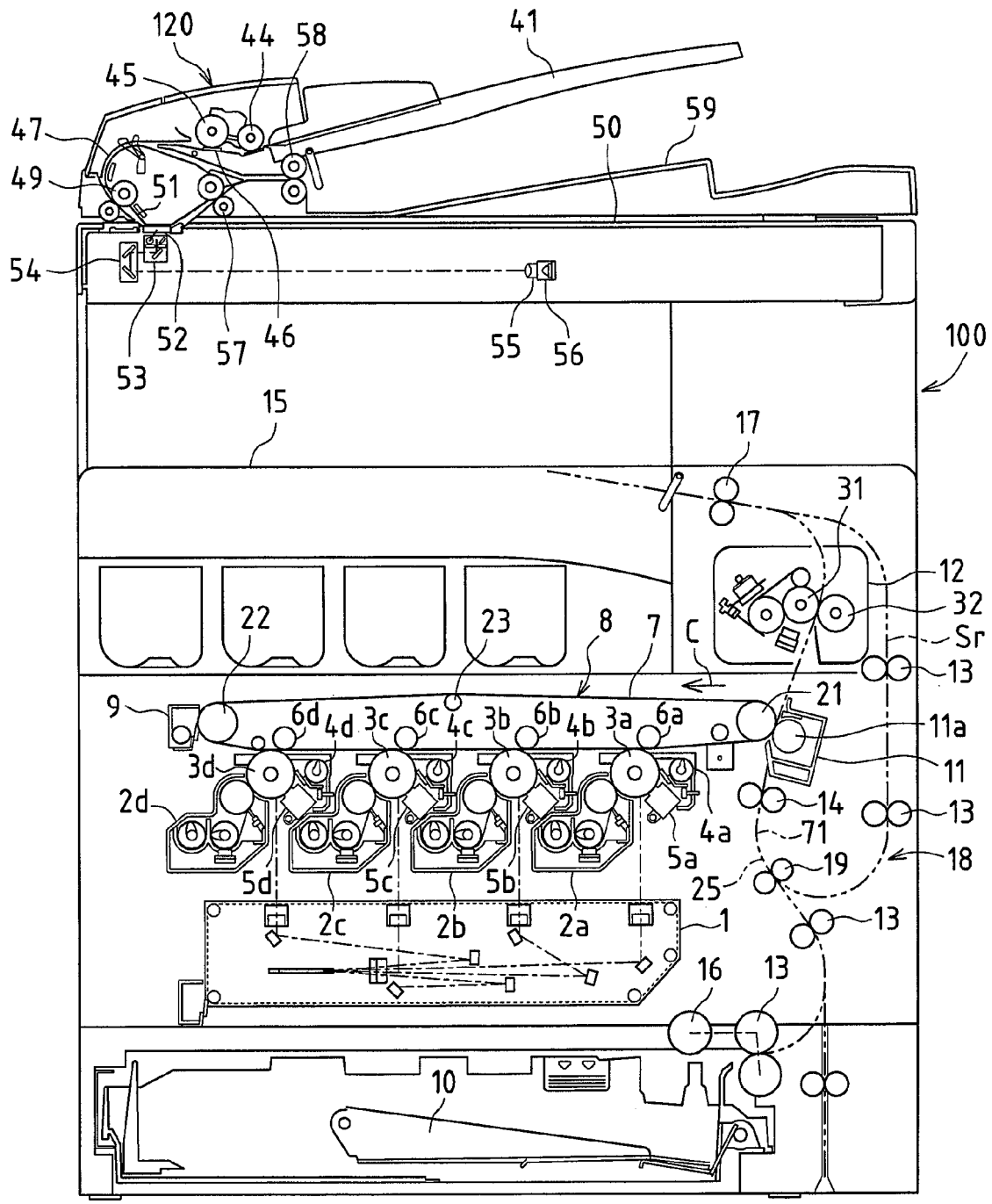
FIG. 1 is a schematic cross-sectional view that shows an image forming apparatus in which an optical scanning apparatus according to an embodiment of the present invention has been applied.

FIG. 1 is a schematic cross-sectional view that shows an image forming apparatus in which an optical scanning apparatus according to an embodiment of the present invention has been applied. This image forming apparatus includes an original reading apparatus 120 that reads an image of an original, and an image forming apparatus 100 that records and forms, on a recording paper in color or in a single color, an image of an original that has been read by the original reading apparatus 120 or an image that has been received from outside.

In the original reading apparatus 120, when originals are set on an original setting tray 41, a pickup roller 44 is pressed against the surface of the originals and rotated, and thus the originals are drawn out from the original setting tray 41 and passed between a subsequent separation roller 45 and a separation pad 46 so as to be separated into individual sheets. Thereafter, the originals are transported to a transport path 47.

In the transport path 47, a leading edge of an original abuts against registration rollers 49 so as to be aligned parallel to the registration rollers 49. Thereafter, the original is transported by the registration rollers 49 and passes between an original guide 51 and a reading glass 52. At this time, light from a light source of a first scanning unit 53 is irradiated onto the surface of an original via the reading glass 52, and the reflected light is made to fall incident to the first scanning unit 53 via the reading glass 52. Then, the reflected light is reflected by mirrors of the first scanning unit 53 and a second scanning unit 54 and led to an imaging lens 55. An image of the original is formed on a CCD (Charge Coupled Device) 56 by the imaging lens 55. The CCD 56 reads the image of the original and outputs image data indicating the image of the original. Further, the original is transported by transport rollers 57 and discharged onto an original discharge tray 59 via discharge rollers 58.

Also, an original placed on an original stage glass 50 can be read. The registration rollers 49, the original guide 51, the original discharge tray 59, and the like, and members disposed above these elements are integrated so as to form a cover body that is pivotably supported so as to be capable of opening/closing on a back side of the original reading apparatus 120. When this cover body provided in the upper part is opened, the original stage glass 50 is released, and an original can be placed on the original stage glass 50. When an original is placed thereon and the cover body is closed, with the first scanning unit 53 and the second scanning unit 54 being moved in the sub scanning direction, the first scanning unit 53 exposes the surface of the original on the original stage glass 50, the first scanning unit 53 and the second scanning unit 54 lead reflected light from the surface of the original to the imaging lens 55, and the image of the original is formed on the CCD 56 by the imaging lens 55. At this time, the first scanning unit 53 and the second scanning unit 54 are moved while maintaining a predetermined speed relationship with each other. Also, the positional relationship between the first scanning unit 53 and the second scanning unit 54 is always maintained in order not to change the length of the optical path of the reflected light (the path from the surface of an original to the first scanning unit 53 and the second scanning unit 54, to the imaging lens 55, to the CCD 56). Consequently, focus of an image of an original on the CCD 56 is always accurately maintained.

The entire original image read in this way is transmitted to/received by the image forming apparatus 100 as image data, and recorded onto a recording paper in the image forming apparatus 100.

On the other hand, the image forming apparatus 100 is configured with an optical scanning apparatus 1, development apparatuses 2, photosensitive drums 3, charging units 5, cleaner apparatuses 4, an intermediate transfer belt apparatus 8, a fixing apparatus 12, a paper transport apparatus 18, a paper feed tray 10, a paper discharge tray 15, and so forth.

Image data handled in the image forming apparatus 100 corresponds to a color image using black (K), cyan (C), magenta (M), and yellow (Y), or corresponds to a monochrome image using a single color (for example, black). Accordingly, four units of each of the development apparatuses 2 (2a, 2b, 2c, and 2d), the photosensitive drums 3 (3a, 3b, 3c, and 3d), the charging units 5 (5a, 5b, 5c, and 5d), and the cleaner apparatuses 4 (4a, 4b, 4c, and 4d) are provided in order to form four types of latent images corresponding to each color. Four image stations are configured with "a" corresponding to black, "b" corresponding to cyan, "c" corresponding to magenta, and "d" corresponding to yellow.

The photosensitive drums 3 are disposed substantially in the center of the image forming apparatus 100. The charging units 5 are charging means for uniformly charging the surface of the photosensitive drums 3 to a predetermined electric potential, and other than a contact roller-type charging unit or a contact brush-type charging unit, a charger-type charging unit can be used as the charging units 5.

The optical scanning apparatus 1 is a laser scanning unit (LSU) including a laser diode and a reflecting mirror, and exposes the surface of the charged photosensitive drums 3 in accordance with image data, and forms an electrostatic latent image on the surface thereof in accordance with the image data.

The development apparatuses 2 develop electrostatic latent images formed on the photosensitive drums 3 using a toner (K, C, M, and Y). The cleaner apparatuses 4 remove and collect residual toner on the surface of the photosensitive drums 3 after developing and transferring images.

The intermediate transfer belt apparatus 8 disposed above the photosensitive drums 3 includes an intermediate transfer belt 7, an intermediate transfer belt drive roller 21, an idler roller 22, intermediate transfer rollers 6 (6a, 6b, 6c, and 6d), and an intermediate transfer belt cleaning apparatus 9.

The intermediate transfer belt 7 is stretched across and supported by the intermediate transfer belt drive roller 21, the intermediate transfer rollers 6, the idler roller 22, and so forth, which allow the intermediate transfer belt 7 to circulate in the direction of arrow C.

The intermediate transfer rollers 6 are rotatably supported near the intermediate transfer belt 7, and pressed against the photosensitive drums 3 via the intermediate transfer belt 7. A transfer bias for transferring the toner images of the photosensitive drums 3 to the intermediate transfer belt 7 is applied to the intermediate transfer rollers 6.

The intermediate transfer belt 7 is provided so as to be in contact with the photosensitive drums 3a, 3b, 3c, and 3d. A toner image on the surface of each of the photosensitive drums 3a, 3b, 3c, and 3d is sequentially superimposed and transferred onto the intermediate transfer belt 7 so as to form a color toner image (toner images of each color). This transfer belt is formed as an endless belt, using a film having a thickness of approximately 100 µm to 150 µm.

A toner image is transferred from the photosensitive drums 3 to the intermediate transfer belt 7 by the intermediate transfer rollers 6, which are pressed against the reverse face of the intermediate transfer belt 7. In order to transfer the toner images, a high voltage transfer bias (a high voltage with the opposite polarity (+) to the charge polarity (−) of the toner) is applied to the intermediate transfer rollers 6. Here, the intermediate transfer rollers 6 use a metal (stainless steel, for example) shaft with a diameter of 8 to 10 mm as a base, and the surface thereof is covered with conductive elastic material (such as EPDM or urethane foam, for example). With this conductive elastic material, it is possible to uniformly apply a high voltage to a recording paper.

As described above, the toner images on the surface of the photosensitive drums 3a, 3b, 3c, and 3d are layered on the intermediate transfer belt 7 and become a color toner image indicated by image data. The toner images of each color layered in this way are transported together with the intermediate transfer belt 7 and transferred onto the recording paper by the secondary transfer apparatus 11, which is in contact with the intermediate transfer belt 7.

The intermediate transfer belt 7 and the transfer roller 11a of the secondary transfer apparatus 11 are pressed against each other to form a nip region. Further, a voltage (a high voltage with opposite polarity (+) to the charge polarity (−) of the toner) for transferring toner images of each color on the intermediate transfer belt 7 onto a recording paper is applied to the transfer roller 11a of the secondary transfer apparatus 11. Furthermore, in order to constantly obtain the nip region, either the transfer roller 11a of the secondary transfer apparatus 11 or the intermediate transfer belt drive roller 21 is made of a hard material (metal or the like), and the other is a roller made of a soft material, such as an elastic roller (elastic rubber roller, foam resin roller, or the like).

The secondary transfer apparatus 11 may not completely transfer a toner image on the intermediate transfer belt 7 onto a recording paper, thus leaving toner on the intermediate transfer belt 7, so that the residual toner causes color toners to be mixed in the following processing. For this reason, the intermediate transfer belt cleaning apparatus 9 removes and collects residual toner. The intermediate transfer belt cleaning apparatus 9 includes, for example, a cleaning blade that is in contact with the intermediate transfer belt 7 as a cleaning member. The intermediate transfer belt 7 is supported by the idler roller 22 from the reverse side, at the position where the cleaning blade is in contact with the intermediate transfer belt 7.

The paper feed tray 10 is a tray for storing recording paper and is provided in the lower part of an image forming unit of the image forming apparatus 100. Also, the paper discharge tray 15 provided in the upper part of the image forming unit is a tray on which a printed recording paper is placed facedown.

Further, the image forming apparatus 100 is provided with a paper transport apparatus 18 for conveying a recording paper on the paper feed tray 10 to the paper discharge tray 15 through the secondary transfer apparatus 11 and the fixing apparatus 12. The paper transport apparatus 18 has an S-shaped paper transport path 25, and transport members such as a pickup roller 16, pre-registration rollers 19, registration rollers 14, the fixing apparatus 12, transport rollers 13, and discharge rollers 17 are disposed along the paper transport path 25.

The pickup roller 16 is a draw-in roller that is provided at the end portion of the paper feed tray 10 and supplies sheets of recording paper one-by-one from the paper feed tray 10 to the paper transport path 25. The transport rollers 13 and the pre-registration rollers 19 are small rollers for promoting and assisting transportation of recording paper, and are provided in a plurality of positions along the paper transport path 25.

The leading edge of the transported recording paper bumps against the registration rollers 14, which are in a stopped state, so that the leading edge is aligned. Then, the registration rollers 14 transport the recording paper in a timely manner, in synchronization with rotation of the photosensitive drums 3 and the intermediate transfer belt 7, so that the color toner image on the intermediate transfer belt 7 is transferred onto the recording paper in the nip region between the intermediate transfer belt 7 and the secondary transfer apparatus 11. For example, the registration rollers 14 transport a recording paper so that the leading edge of a color toner image on the intermediate transfer belt 7 matches the leading edge of the image forming range of the recording paper in the nip region between the intermediate transfer belt 7 and the secondary transfer apparatus 11.

The fixing apparatus 12 receives a recording paper on which a toner image has been transferred, and transports the recording paper sandwiched between a heat roller 31 and a pressure roller 32. The heat roller 31 is controlled to become a predetermined fixing temperature, and has a function of, by applying heat and pressure to the recording paper together with the pressure roller 32, melting, mixing, and applying pressure to a toner image that has been transferred to a recording paper, and fixing that toner image on the recording paper with heat.

The recording paper on which toner images of each color have been fixed is discharged by the discharge rollers 17 onto the paper discharge tray 15.

Note that it is also possible to form a monochrome image using only an image forming station Pa, and transfer the monochrome image onto the intermediate transfer belt 7 of the intermediate transfer belt apparatus 8. This monochrome image is transferred onto a recording paper from the intermediate transfer belt 7 and fixed onto the recording paper, similarly to a color image.

Further, when an image is formed not only on the front face of the recording paper, but on both faces, after an image on the front face of the recording paper has been fixed by the fixing apparatus 12, the discharge rollers 17 are stopped and then rotated in reverse while transporting the recording paper by the discharge rollers 17 in the paper transport path 25, thereby causing the recording paper to pass through a reverse path Sr. After the front and back of the recording paper are reversed, the recording paper is again led to the registration rollers 14. Similarly to the case of forming an image on the front face of the recording paper, an image is recorded and fixed on the back face of the recording paper, and the recording paper is discharged onto the paper discharge tray 15.

Embodiment 1

Figure 2:
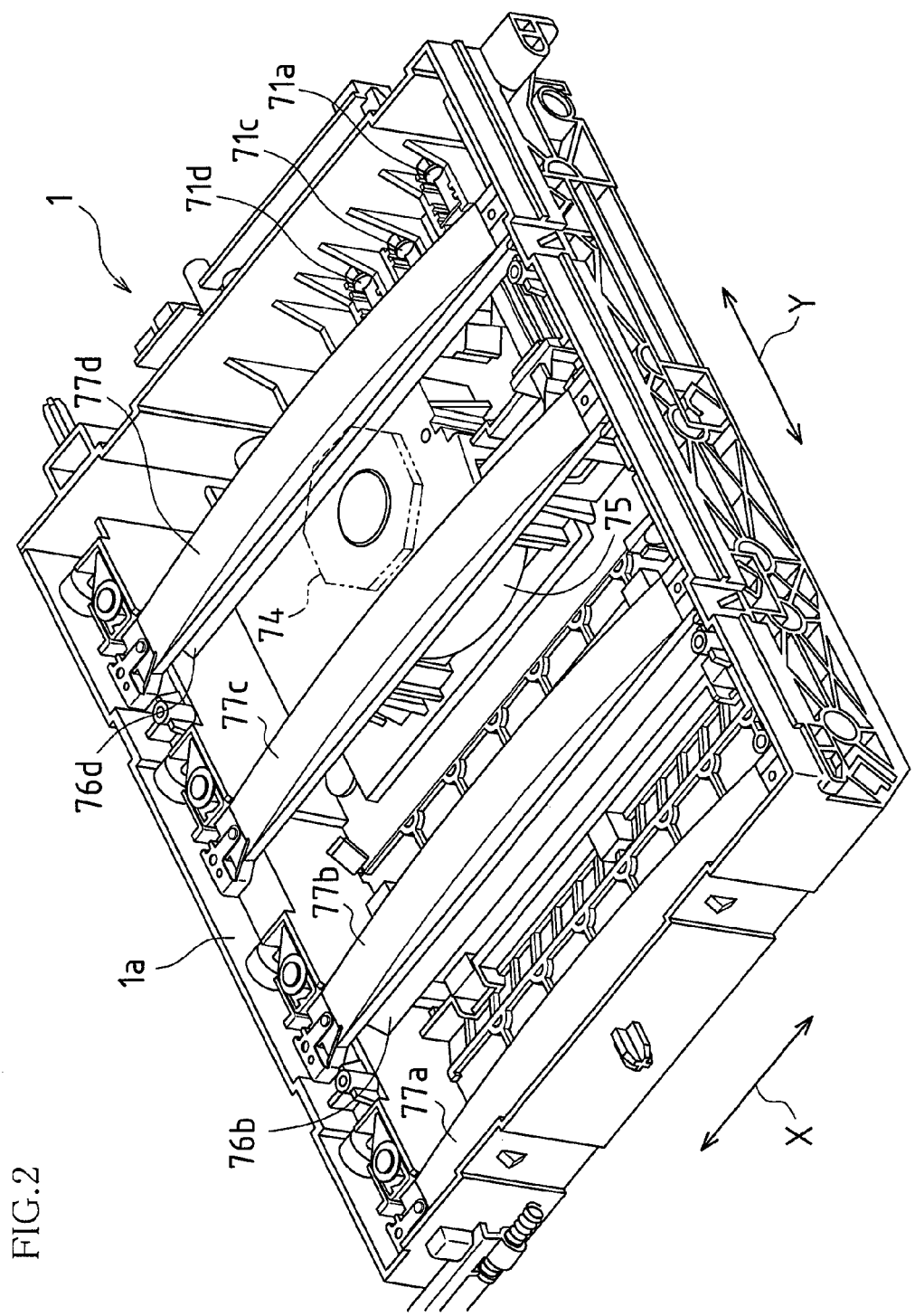
FIG. 2 is a perspective view that shows the optical scanning apparatus according to Embodiment 1 in detail.

FIG. 2 is a perspective view that shows the optical scanning apparatus 1 according to Embodiment 1 in detail, FIG. 3(a) is a schematic plan view of the optical scanning apparatus 1, and FIG. 3(b) is a schematic cross-sectional view of the optical scanning apparatus 1.

In the optical scanning apparatus 1 of this embodiment, respective laser diodes 71 (71c, 71d, 71a, and 71b) that correspond to the colors black (K), cyan (C), magenta (M), and yellow (Y); mirrors 72 (72a, 72b, 72c, and 72d) that reflect laser beams of the laser diodes 71a to 71d; a mirror 73 that reflects the laser beams from the mirrors 72a to 72d; a rotating polygon mirror 74 (referred to below as a polygon mirror) that reflects the laser beams from the mirror 73; a first fθ lens 75 that refracts the laser beams from the polygon mirror 74, a plurality of mirrors 76 (76a, 76b, 76c, and 76d) that separately reflect the laser beams that have permeated the first fθ lens 75; and four second fθ lenses 77 (77a, 77b, 77c, and 77d) that separately refract the laser beams from the mirrors 76a to 76d are disposed at predetermined positions within a case 1a. It is noted that, with respect to reference numerals of the laser diodes 71a to 71d and the mirrors 72a to 72d, "a", "b", "c" and "d" are used to have different meanings from those of the image stations or the like. Further, the laser diodes 71a to 71d are disposed at respective different positions in a direction perpendicular to the plane of FIG. 3(a).

Figure 4:
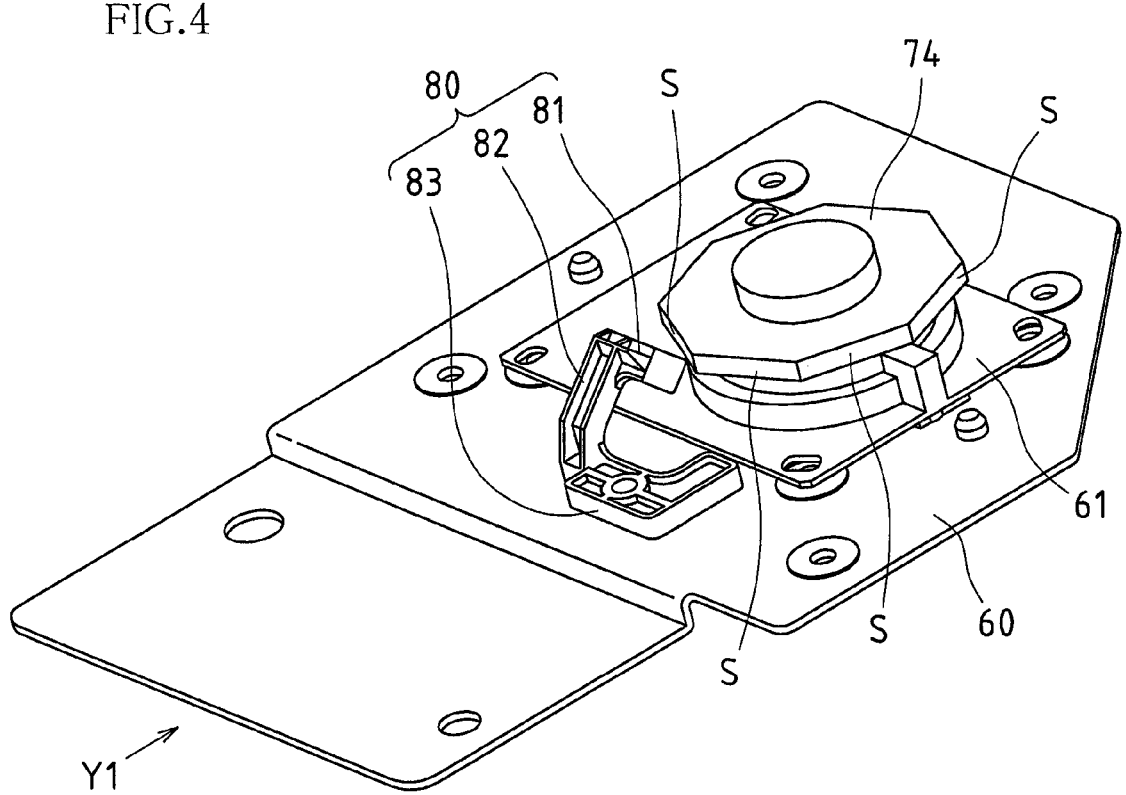
FIG. 4 is a perspective view that shows the vicinity of a polygon mirror, where a light blocking member according to Embodiment 1 is provided.
Figure 5:
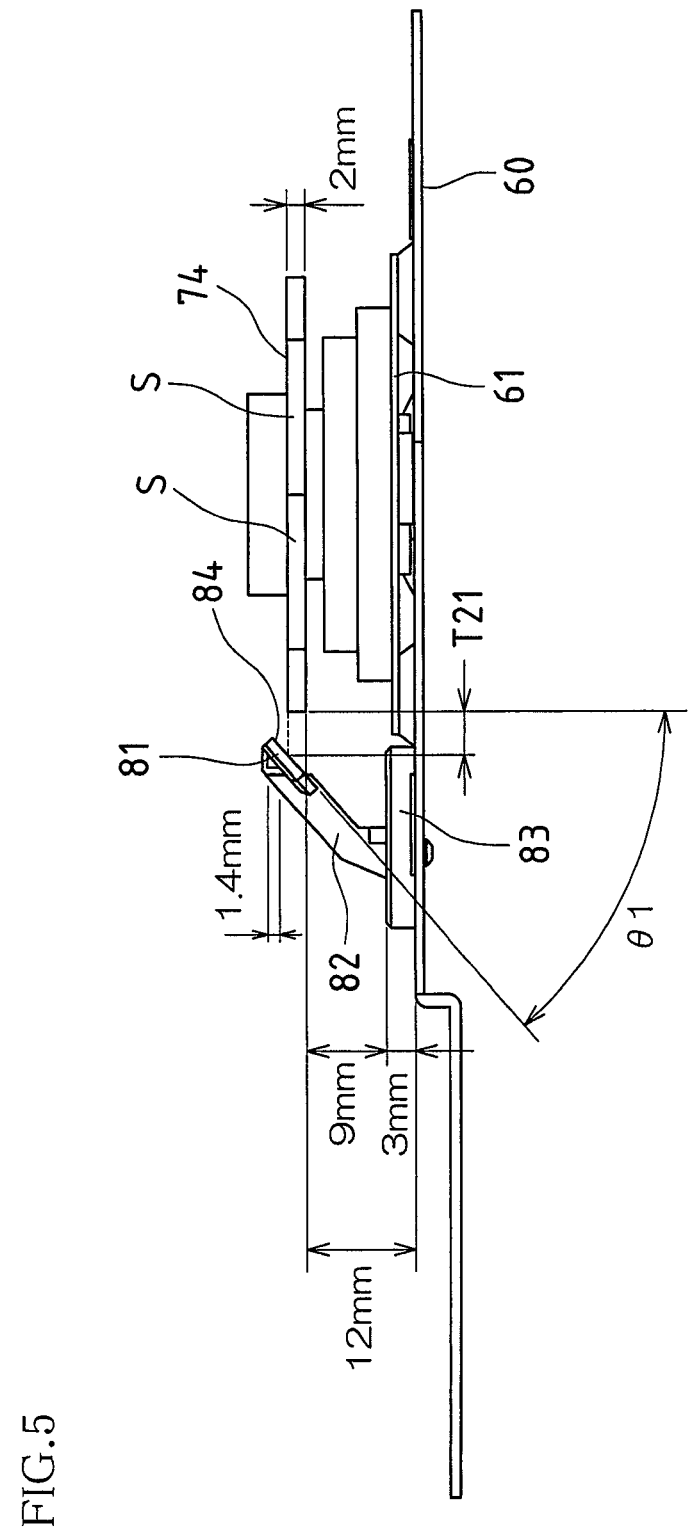
FIG. 5 is a cross-sectional view that shows the vicinity of the polygon mirror, where the light blocking member according to Embodiment 1 is provided.

The polygon mirror 74 is an 8-sided regular polygonal column, and is driven to rotate at high speed, so that laser beams are reflected by mirrors (reflective faces) of circumferential faces of the polygon mirror 74, and thus repeatedly scanned in a main scanning direction X. As shown in FIGS. 4 and 5 described below, the polygon mirror 74 is fixed to a mirror mounting base 61 in a rotatably supported manner, and this mirror mounting base 61 is fixed with screws or the like (not shown) so as to be supported on a support member 60 that is mounted and fixed within the case 1a.

The first fθ lens 75, the mirrors 76, and the second fθ lenses 77, in order to reflect and refract the respective laser beams that are repeatedly scanned in the main scanning direction X, are formed in a bar-like shape that is made longer in the main scanning direction X, and made shorter in the direction orthogonal to the main scanning direction X, and both ends of the first fθ lens 75, the mirrors 76, and the second fθ lenses 77 are supportably fixed to the case 1a.

The laser beam emitted from the laser diode 71c that corresponds to black is sequentially reflected by the mirror 72c, the mirror 72a and the mirror 73, and is reflected by the polygon mirror 74 and scanned in the main scanning direction X. Furthermore, that laser beam permeates the first fθ lens 75, is reflected by the mirror 76a, permeates the second fθ lens 77a, and is incident on the photosensitive drum 3a that corresponds to black. It is noted that the mirror 72b is disposed at a position so as not to interrupt the laser beam reflected by the mirror 72*c* in a direction perpendicular to the plane of FIG. 3(*a*).

The laser beam emitted from the laser diode 71*d* that corresponds to cyan is sequentially reflected by the mirror 72*d*, the mirror 72*a*, and the mirror 73, and is reflected by the polygon mirror 74 and scanned in the main scanning direction X. Furthermore, that laser beam permeates the first fθ lens 75, is reflected by two mirrors 76*b*, permeates the second fθ lens 77*b*, and is incident on the photosensitive drum 3*b* that corresponds to cyan. It is noted that the mirrors 72*b* and 72*c* are disposed at positions so as not to interrupt the laser beam reflected by the mirror 72*d* in a direction perpendicular to the plane of FIG. 3(*a*).

The laser beam emitted from the laser diode 71*a* that corresponds to magenta is reflected by the mirror 73, and is reflected by the polygon mirror 74 and scanned in the main scanning direction X. Furthermore, that laser beam permeates the first fθ lens 75, is reflected by two mirrors 76*c*, permeates the second fit lens 77*c*, and is incident on the photosensitive drum 3*c* that corresponds to magenta. It is noted that the mirror 72*a* is disposed at a position so as not to interrupt the laser beam emitted from the laser diode 71*a* in a direction perpendicular to the plane of FIG. 3(*a*).

The laser beam emitted from the laser diode 71*b* that corresponds to yellow is sequentially reflected by the mirror 72*b*, the mirror 72*a* and the mirror 73, and is reflected by the polygon mirror 74 and scanned in the main scanning direction X. Furthermore, that laser beam permeates the first fθ lens 75, is reflected by two mirrors 76*d*, permeates the second fθ lens 77*d*, and is incident on the photosensitive drum 3*d* that corresponds to yellow.

Figure 3:
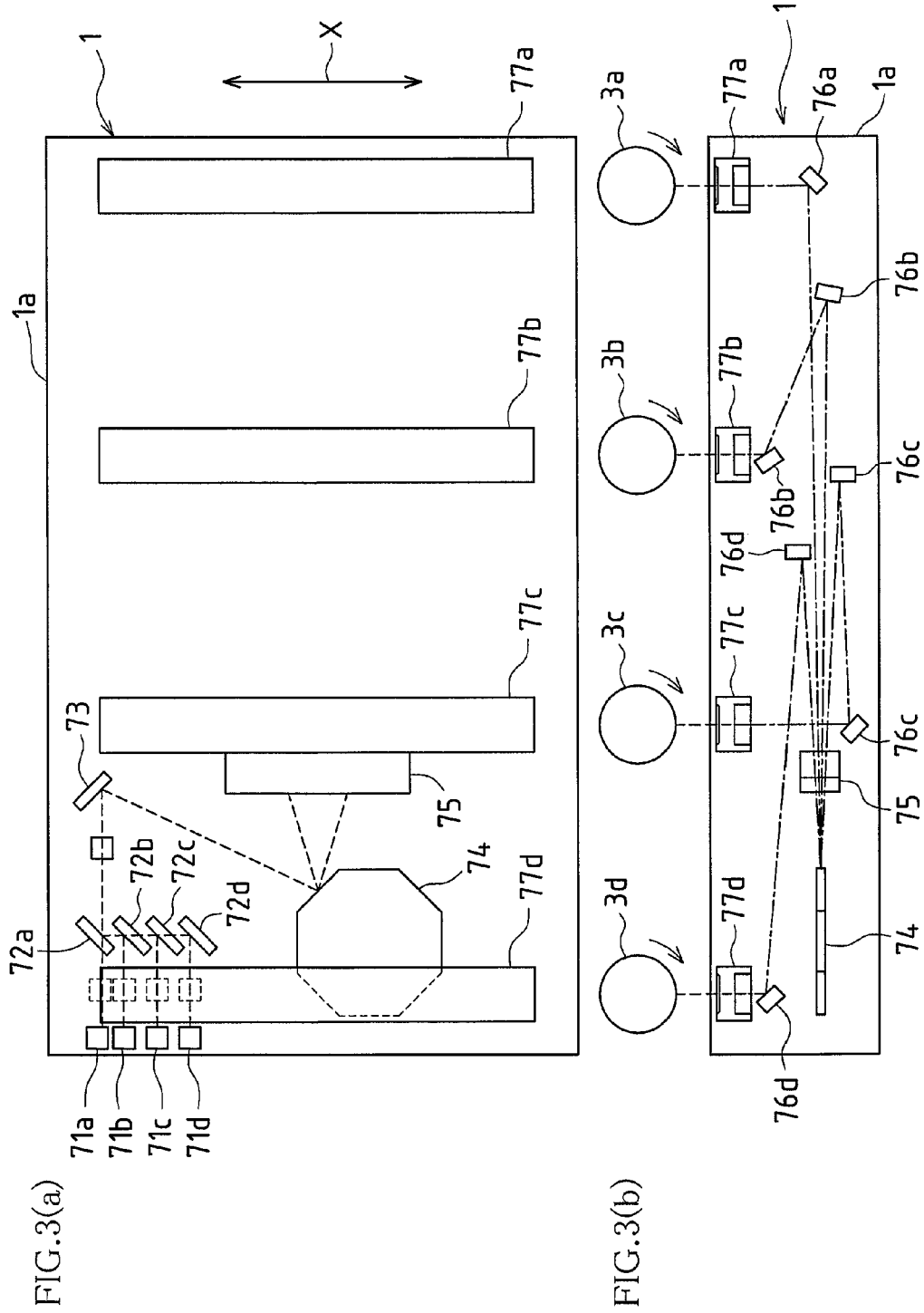
FIG. 3($a$) is a schematic plan view of the optical scanning apparatus according to Embodiment 1, and FIG. 3($b$) is a schematic cross-sectional view of that optical scanning apparatus.

The photosensitive drums 3*a* to 3*d* are rotationally driven in the direction of the arrow shown in FIG. 3(*b*), and are irradiated with the respective laser beams that are repeatedly scanned in the main scanning direction X, and thus respective electrostatic latent images are formed on the surface of the photosensitive drums 3*a* to 3*d*. The electrostatic latent images on the surface of the photosensitive drums 3*a* to 3*d* are each developed to become toner images, and these toner images are stacked and transferred to recording paper via the intermediate transfer belt 7, becoming a color toner image on the recording paper.

Figure 13:
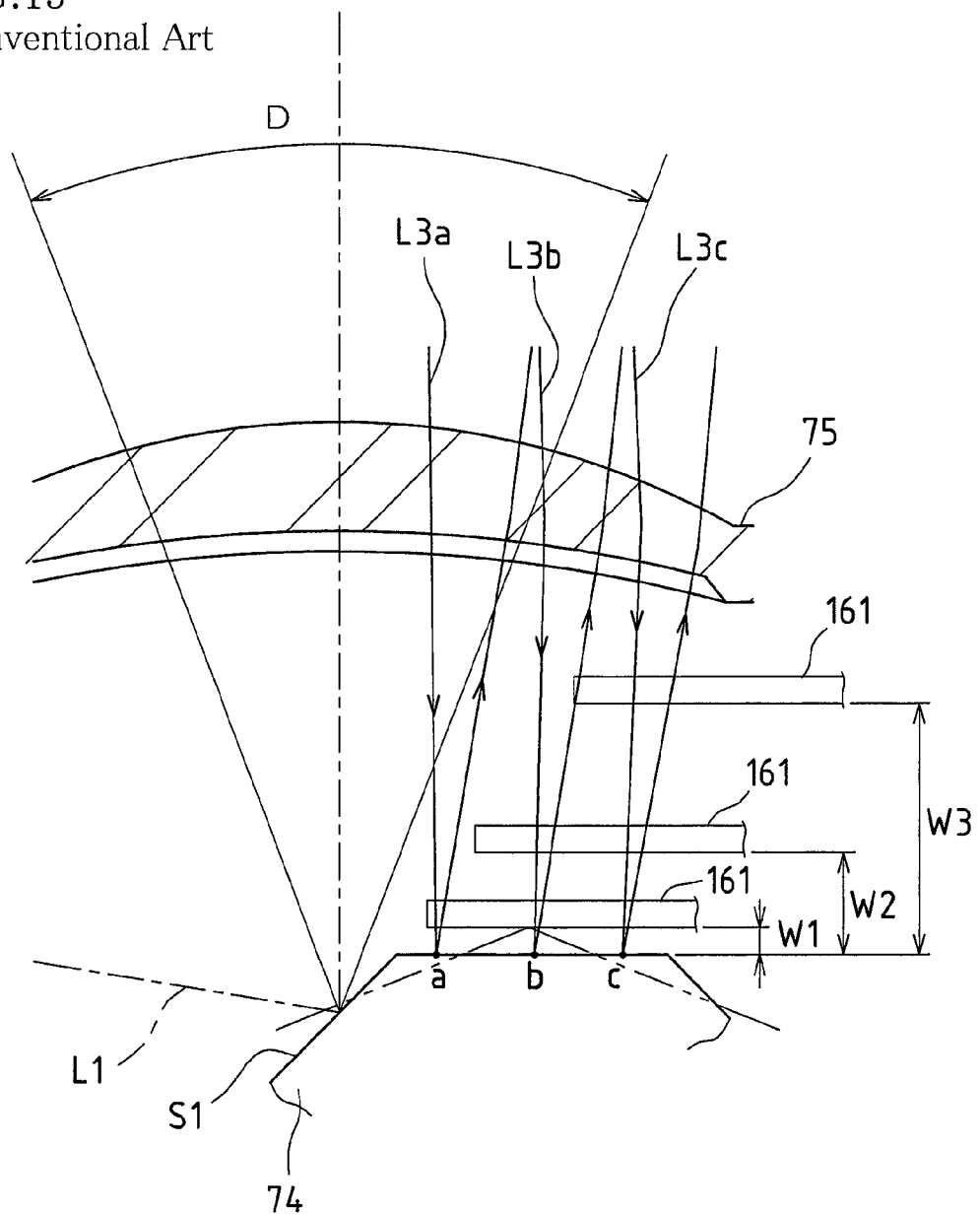
FIG. 13 illustrates the disposed position of a light blocking member.
Figure 15A:
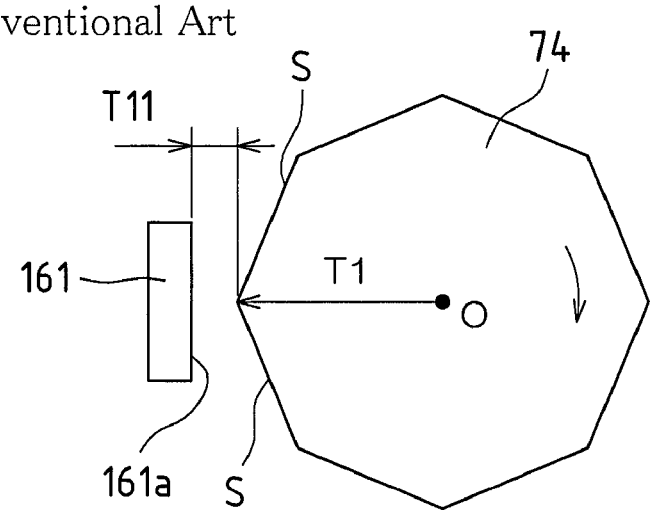
FIGS. 15($a$), 15($b$), and 15($c$) illustrate a flow of air
Figure 15B:
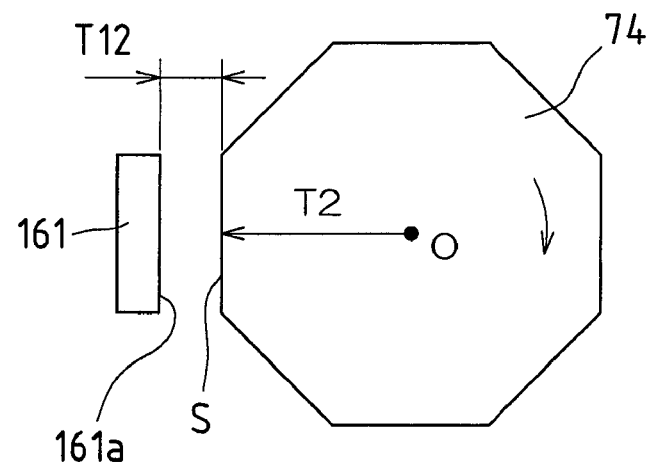
Figure 15C:
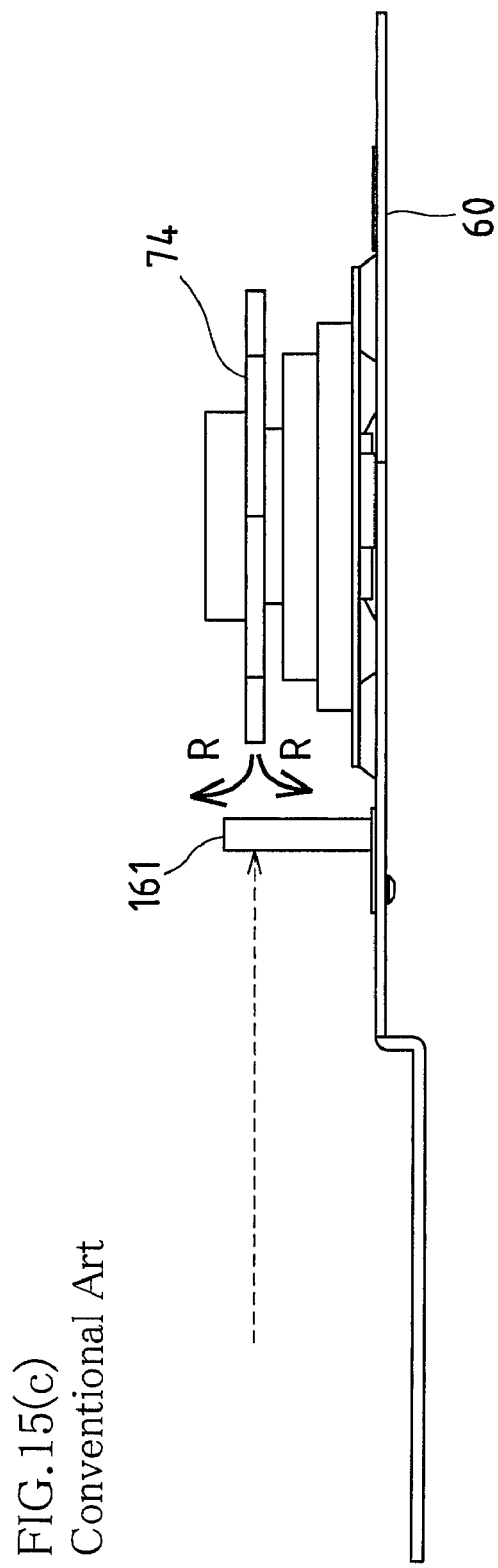

In the above configuration, as shown in FIGS. 4 and 5, in the present embodiment as well, same as in the conventional technology described above, a light blocking member 80 is disposed nearby facing a reflective face S, which is a circumferential face of the polygon mirror 74, at a position (i.e., a nearby position distanced by W1 or W2 shown in FIG. 13) where it is possible to reliably block stray light without blocking the effective scanning range D. However, in the present embodiment, high-pitched vibration noise that occurs due to disposing the light blocking member 80 near the polygon mirror 74, which is a problem in the conventional technology described above, is reduced. FIG. 4 is a perspective view that shows the vicinity of the polygon mirror 74, and FIG. 5 is a cross-sectional view of the vicinity of the polygon mirror 74.

More specifically, this light blocking member 80 includes a light blocking plate 81 having an opposing face 84 that faces a reflective face S of the polygon mirror 74, a support plate 82 that supports the light blocking plate 81, and a fixing plate 83 that fixes a lower edge portion of the support plate 82 to the support member 60. The opposing face 84 of the light blocking plate 81 is inclined. Specifically, the opposing face 84 of the light blocking plate 81 is inclined such that the upper edge portion is near the reflective face S of the polygon mirror 74, and the distance from the reflective face S increases moving downward in the opposing face 84. This inclination angle (i.e., the inclination angle of the opposing face 84 of the light blocking plate 81 relative to the reflective face S of the polygon mirror 74) θ1 may be set as desired within a range of about 30 to 45 degrees, but in consideration of the distance from the polygon mirror 74 (i.e., in order to not be too close to the polygon mirror 74), an inclination angle of about 45 degrees is preferable.

Incidentally, a shortest distance (distance in the horizontal direction) T21 (see FIG. 5) between the opposing face 84 of the light blocking plate 81 and the upper edge portion of the reflective face S of the polygon mirror 74 is about 4 mm. The height of the light blocking plate 81 in the vertical direction, at a minimum, may be such that it is possible to block the reflective face S of the polygon mirror 74 from light in the horizontal direction. Accordingly, the vertical position of the lower edge portion of the light blocking plate 81 and the vertical position of the lower edge portion of the reflective face S of the polygon mirror 74 may be set to the same height. Thus, it is possible to increase the size of an open portion below, so that airflow resistance is less likely. Here, the distance (height) from the lower edge portion of the reflective face S of the polygon mirror 74 to the support member 60 is about 12 mm, and the thickness of the fixing plate 83 of the light blocking member 80 is about 3 mm, so the height of the opening from the lower edge portion of the light blocking plate 81 to the fixing plate 83 is about 9 mm.

On the other hand, the vertical position of the upper edge portion of the light blocking plate 81 may be extended somewhat upward from the upper edge portion of the reflective face S of the polygon mirror 74. The length of this extension may be about 1.4 mm. Here, when the thickness of the reflective face S of the polygon mirror 74 is set to about 2 mm, the width of the light blocking plate 81 becomes about 5 mm. Also, the width of the support plate 82 that supports this light blocking plate 81 is about 6 mm (see FIG. 6). Further, the thickness of the light blocking plate 81 and the support plate 82 is about 2 mm, and is about 3.5 mm when including the height of a rib piece formed for reinforcement.

Figure 7:
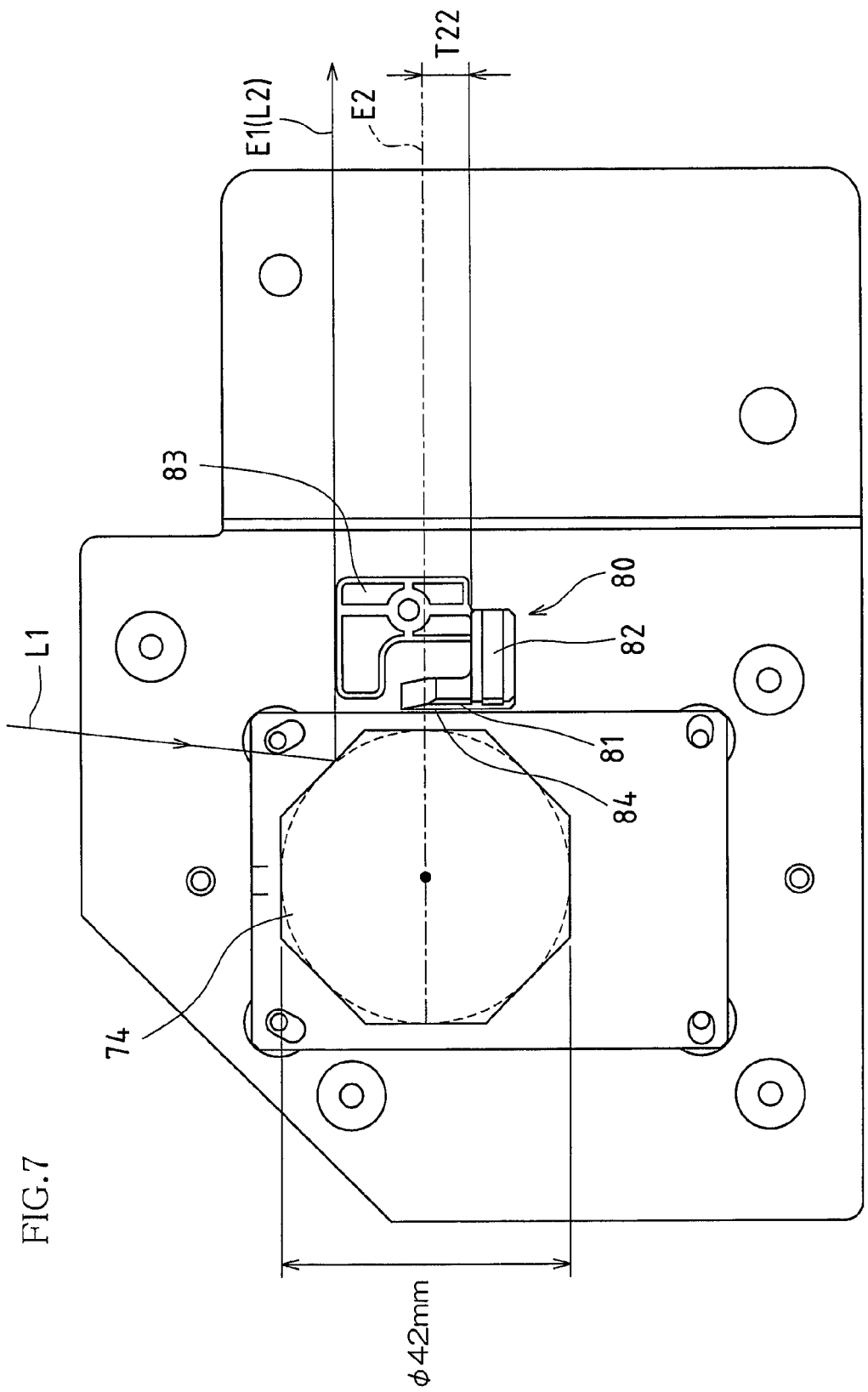
FIG. 7 is a plan view that shows the vicinity of the polygon mirror, where the light blocking member according to Embodiment 1 is provided.

Also, in this embodiment, the light blocking plate 81 is supported in a cantilever manner by the support plate 82. That is, when viewed from the direction arrow Y1 in FIG. 4, the light blocking member 80 as a whole is formed in a U shape, and the space below the light blocking plate 81 is open. More specifically, as shown in FIG. 7, the opposing face 84 of the light blocking plate 81 is disposed so as to be orthogonal to a parallel axis E2 that passes through a rotational center O of the polygon mirror 74 and is parallel to a laser irradiation direction E1 when irradiating a laser beam to the center of the effective scanning region of the surface of a photosensitive drum. The support plate 82, which supports the light blocking plate 81 disposed in this manner, is provided at a position (in FIG. 7, a position offset downward from the center of FIG. 7) offset by a predetermined distance T22 in the horizontal direction relative to this horizontal axis E2. Incidentally, the predetermined distance T22 is about 7.5 mm when the diameter of a circle that touches each reflective face of the polygon mirror 74 is set to about 42 mm.

Figure 8:
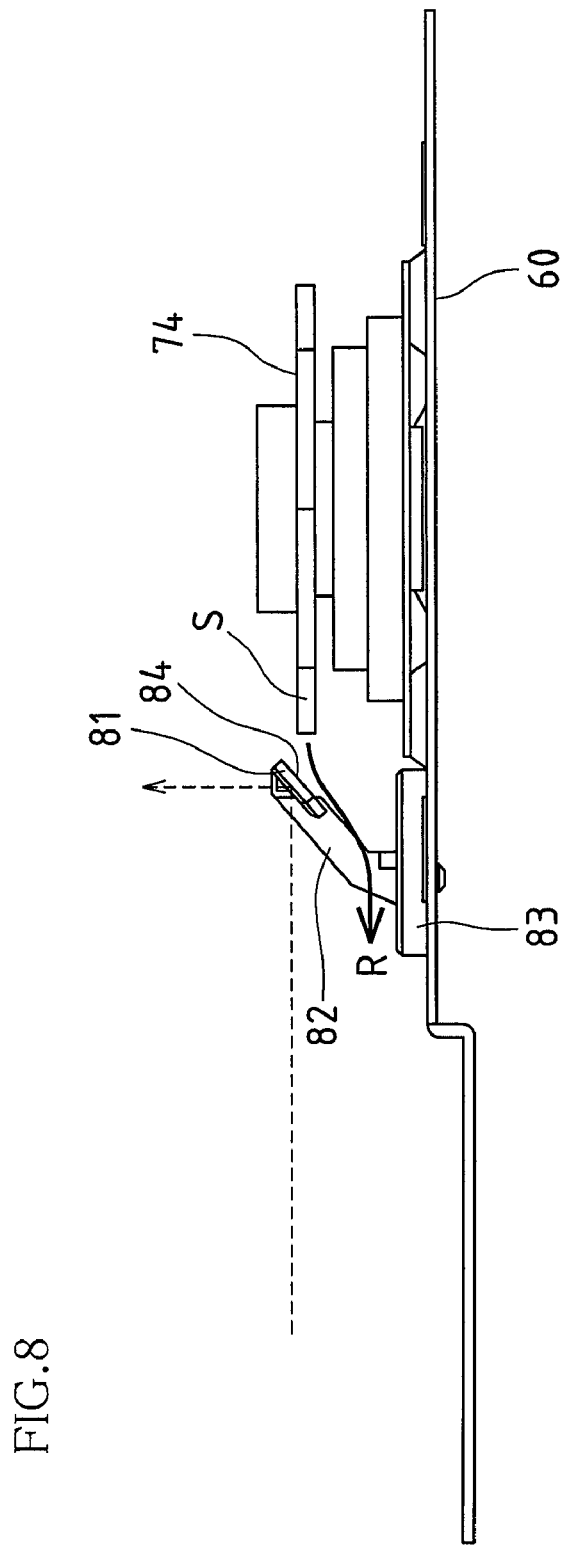
FIG. 8 is a cross-sectional view that shows the vicinity of the polygon mirror, where the light blocking member according to Embodiment 1 is provided.

As in the description of the conventional technology, when a light blocking member is provided standing perpendicular to the support member, air that attempts to flow to the outside and downward is completely stopped by the vertical face of the light blocking member, so the flow of air is completely prevented. However, as in the present embodiment, by inclining the opposing face 84 of the light blocking plate 81 that faces the reflective face S of the polygon mirror 74, as shown in FIG. 8, the airflow R flows downward along this tilted face 84 so that there is no great change in the flow of air, and as a result a large air pressure is not applied to the light blocking plate 81. Also, even if a sparse/dense state of air (airflow) occurs between the light blocking plate 81 and the reflective face S of the polygon mirror 74, the air pressure on the light blocking plate 81 is reduced as described above, so it is possible to reduce the effect of vibration of the light blocking member 80 (more specifically, vibration of the light blocking plate 81 including the support plate 82) due to a sparse/dense state of airflow occurring repeatedly at high speed.

Also, in this embodiment, as described above, the space below the light blocking plate 81 is open. Accordingly, air that flows downward along the light blocking plate 81 is afterward not obstructed by the light blocking plate 81, and therefore is able to smoothly flow to the outside via the opening below the light blocking plate 81. Thus, it is possible to further reduce the pressure received by the light blocking member 80 from the airflow.

More specifically, by opening the lower part of the light blocking member 80, and inclining the opposing face 84 of the light blocking plate 81, even when the light blocking member 80 is disposed near the polygon mirror 74, there is substantially no blocking of the flow of the airflow R that occurs due to high speed rotation of the polygon mirror 74, so the airflow R can flow smoothly to the outside. Accordingly, even if a sparse/dense state of airflow occurs repeatedly at high speed between the reflective face S of the polygon mirror 74 and the opposing face 84 of the light blocking plate 81 of the light blocking member 80 due to high speed rotation of the polygon mirror 74, the sparse/dense difference in that sparse/dense state is very small compared to the case of the conventional technology described above, and so a pressure strong enough to vibrate the light blocking plate 81 does not occur. Even assuming that the light blocking plate 81 does vibrate and emit vibration noise, that noise is comparatively low-pitched, and there is a miniscule amount of vibration noise compared to the case of the conventional technology, so the user is not made uncomfortable.

Figure 6:
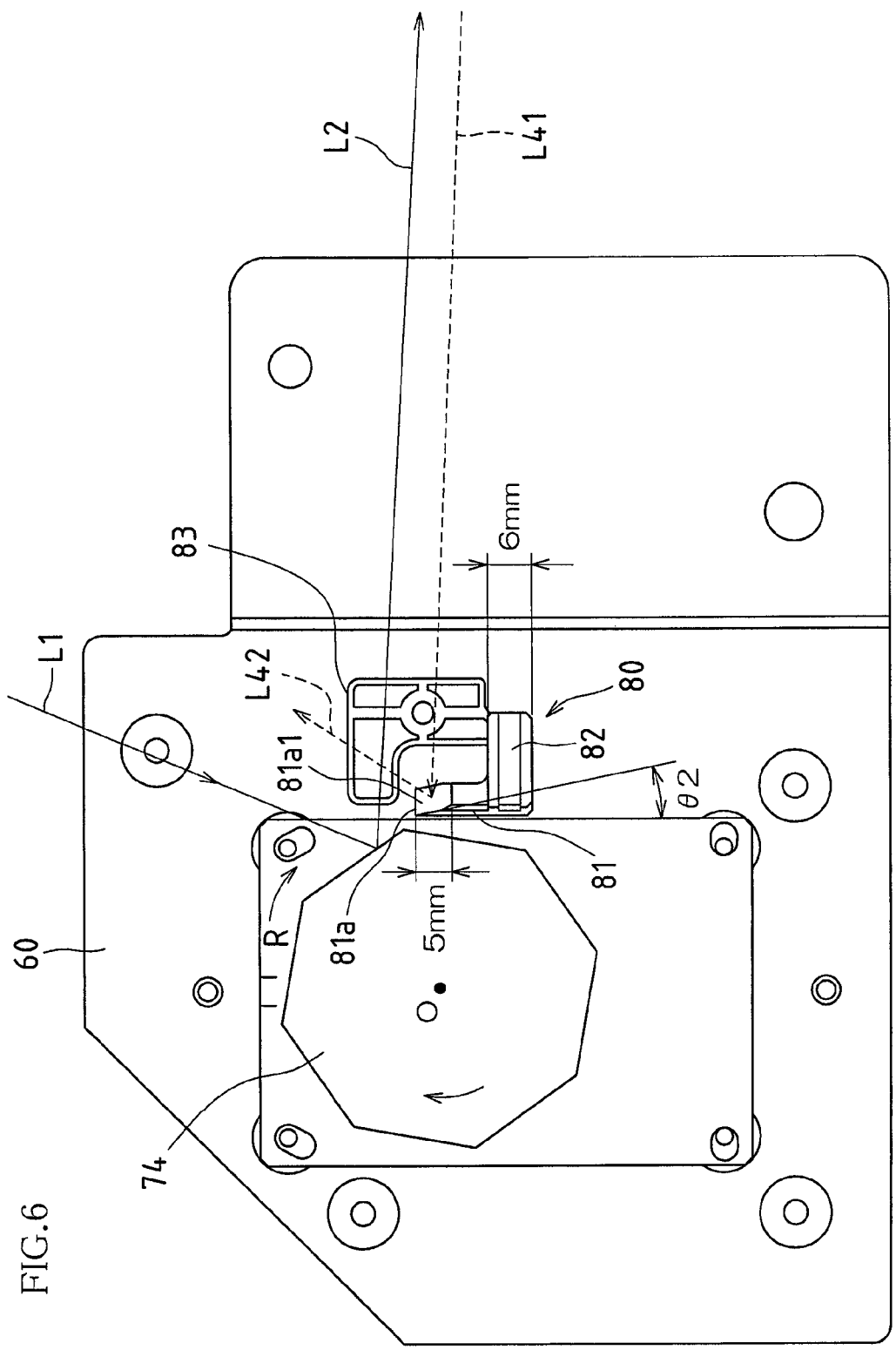
FIG. 6 is a plan view that shows the vicinity of the polygon mirror, where the light blocking member according to Embodiment 1 is provided.

Furthermore, in the present embodiment, as shown in FIG. 6, a lateral end portion 81a of the blocking plate 81, which is the receiving side of the airflow R that occurs due to rotation of the polygon mirror 74, is formed thinly so as to reduce the resistance of the airflow R. Specifically, an outside face 81a1 of the lateral end 81a of the light blocking plate 81 is formed in a so-called wedge shape, provided inclined relative to the flow of the airflow R. Thus, the airflow R that occurs in the rotational direction along with high speed rotation of the polygon mirror 74 can be cut with the lateral end 81a of the light blocking plate 81 and released to the outside, so a large air pressure is not applied to the light blocking plate 81 by the airflow R that occurs in the rotational direction. Incidentally, an inclination angle θ2 of the outside face (inclined face) 81a1 of the light blocking plate 81 is about 17 degrees, and the width of the outside face (inclined face) 81a1 in the horizontal direction is about 5 mm.

Also, in the present embodiment, it is preferable that the light blocking member 80 is formed with a material (for example, a resin such as polycarbonate (PC), PCABS, or ABS) that has adequate rigidity and therefore does not easily plastically deform even when an external force is received. By adopting a sturdy configuration for the light blocking member itself, even if high speed airflow occurs due to high speed rotation of the polygon mirror 74 and is stopped, and so vibration occurs, the amount of that vibration is low, and there is little vibration noise, so it is possible to suppress vibration noise to the extent that there is no discomfort to the user.

Also, by forming the outside face 81a1 of the lateral end 81a of the light blocking plate 81 as an inclined face as described above, as shown in FIG. 6, stray light L41 that has returned towards the reflective face S of the polygon mirror 74 can be reflected by the outside face (inclined face) 81a1 of the light blocking plate 81 in a completely different direction than the direction of the scanning laser beam L2. Accordingly, the likelihood that this reflected stray light L42 will again return to the reflective face S of the polygon mirror 74 can be greatly reduced. That is, it is possible to further increase the light blocking effect.

Also, from the viewpoint of the light blocking effect, it is preferable that the light blocking member 80 is formed with a material of a color having low reflectivity (for example, such as black or gray). By forming the light blocking member 80 with a material having low reflectivity, most of stray light that has returned towards the reflective face S of the polygon mirror 74 can be absorbed (extinguished) by the light blocking member 80 itself. Thus, even if part of the stray light that has returned has been reflected by the light blocking member 80, the likelihood that this reflected stray light will again return to the reflective face S of the polygon mirror 74 can be greatly reduced.

Furthermore, from the viewpoint of the light blocking effect, the face (the outside face where the inclined face 81a is formed) on the opposite side from the opposing face 84 that faces the reflective face S of the polygon mirror 74 may be formed with a surface roughness that disperses a laser beam. By forming the outside face of the light blocking member 80 with a surface roughness that disperses a laser beam, stray light that has returned towards the reflective face S of the polygon mirror 74 can be reflected in a dispersed manner by the outside face of the light blocking plate 80. Thus, the likelihood that the stray light reflected in a dispersed manner will again return to the reflective face S of the polygon mirror 74 can be greatly reduced.

Embodiment 2

Figure 9:
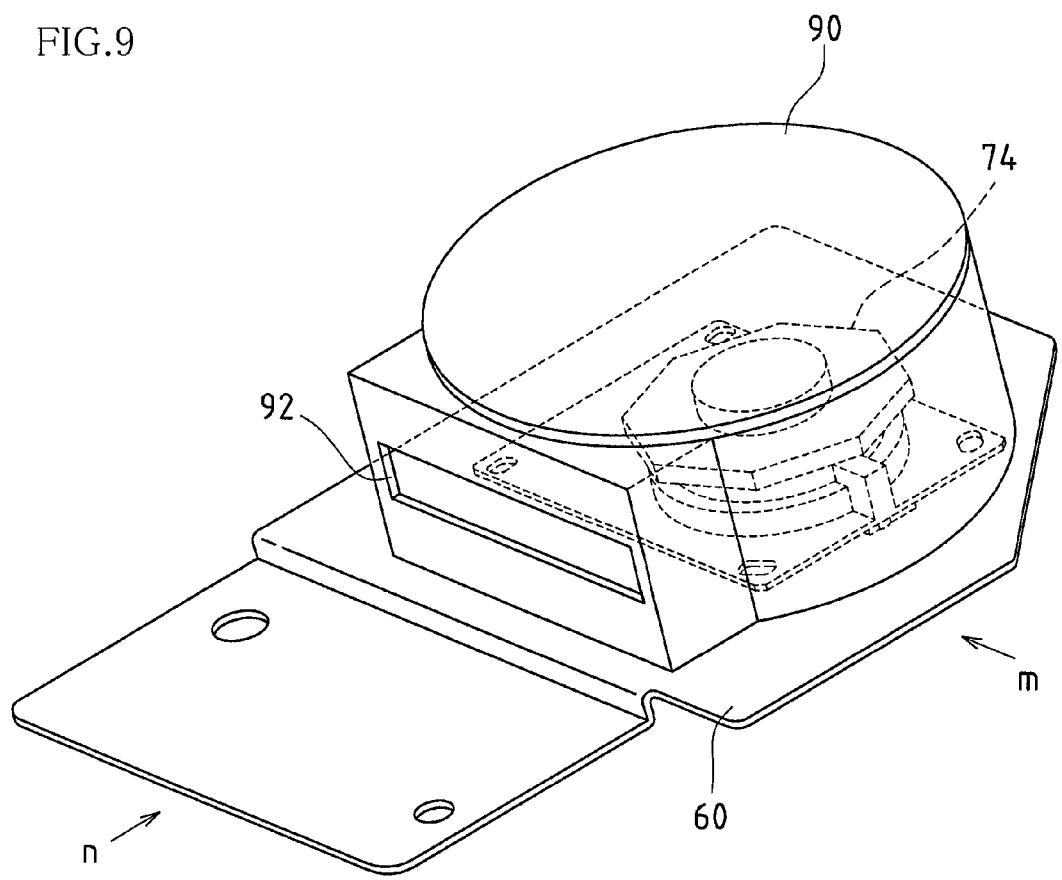
FIG. 9 is a perspective view that shows an optical scanning apparatus according to Embodiment 2.

According to the optical scanning apparatus of above Embodiment 1, a structure is adopted in which the light blocking member 80 is fixed to the support member 60. However, as shown in FIG. 9, with the object of preventing the entrance of extraneous light or dust, and blocking motor noise and so forth, a cover member (housing) 90 in the shape of approximately a circular cylinder that covers the entire polygon mirror 74 from above may be provided. In this cover member 90, a laterally long opening 92 is provided in a side face in the direction that a scanning laser is emitted. The opening 92 is formed with a slightly wider width than the effective scanning range of a scanning laser beam that has been reflected by the polygon mirror 74. In an optical scanning apparatus provided with this sort of cover member 90, it is possible to adopt a structure in which a light blocking member is supportably fixed to the cover member 90. In this Embodiment 2, a light blocking member is provided in the cover member 90.

Figure 10A:
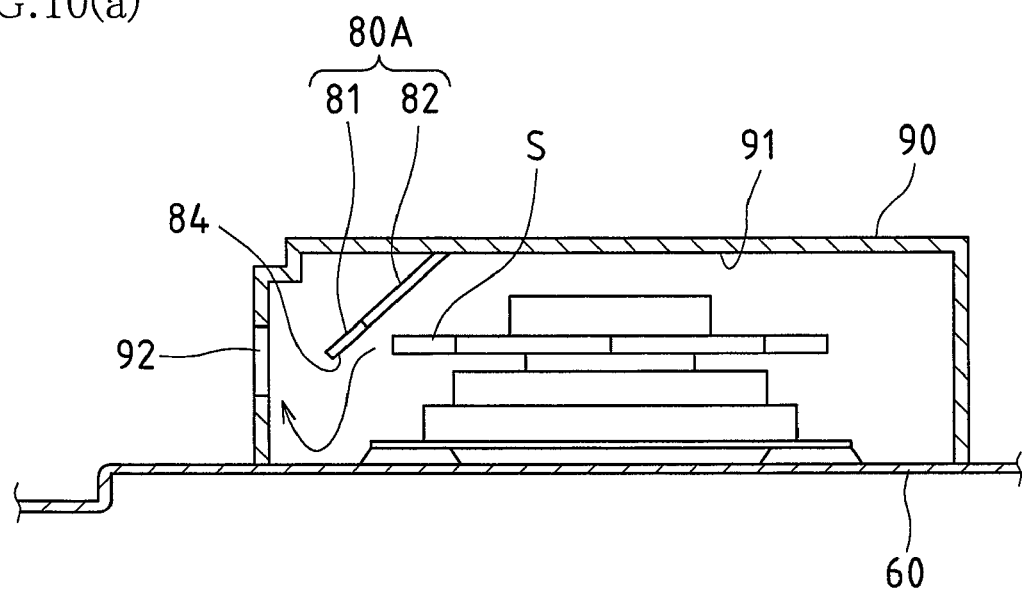
FIGS. 10($a$) and 10($b$) are cross-sectional views that show the vicinity of a polygon mirror, where a light blocking member according to Embodiment 2 is provided.
Figure 10B:
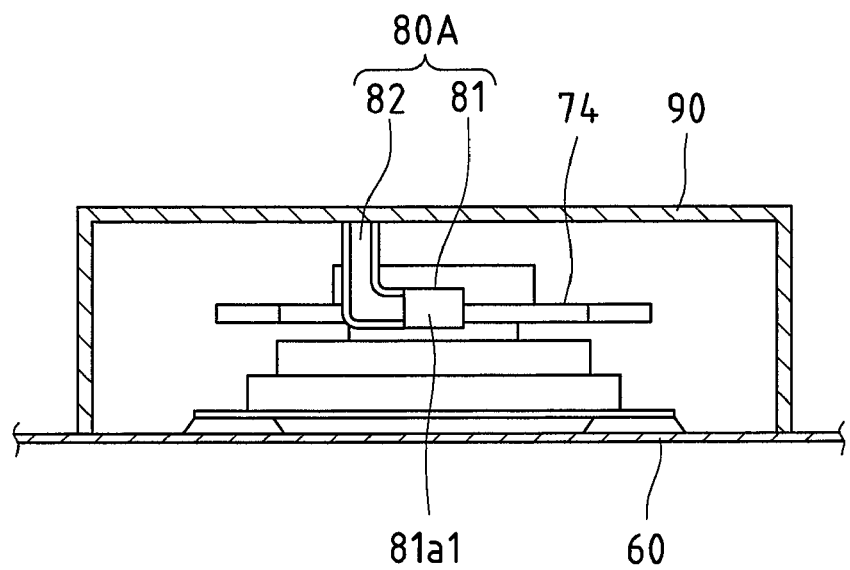
Figure 11:
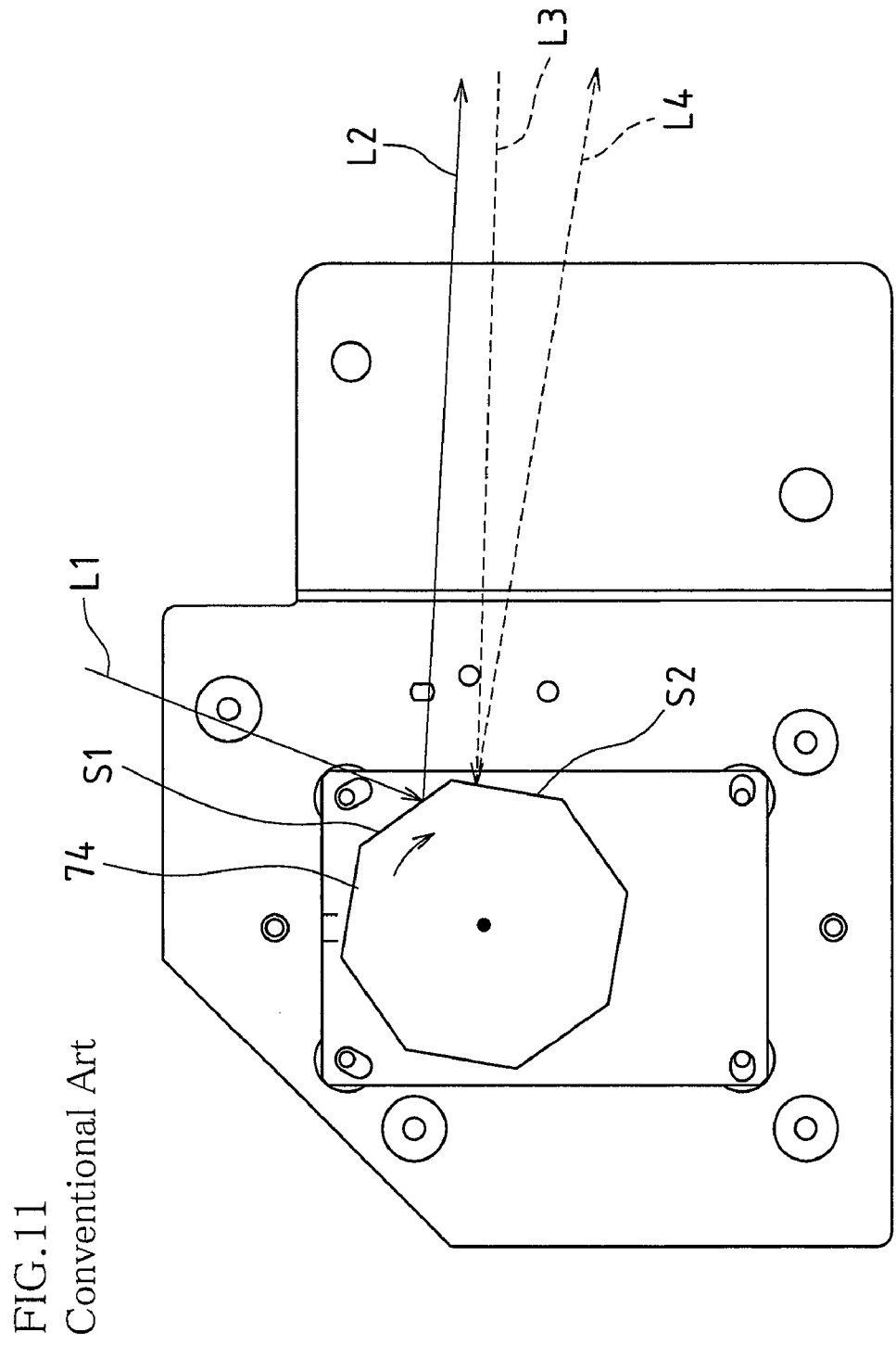
FIG. 11 is a plan view that shows the relationship between an incident laser beam, a reflected laser beam, and stray light from an 8-faced polygon mirror.
Figure 12:
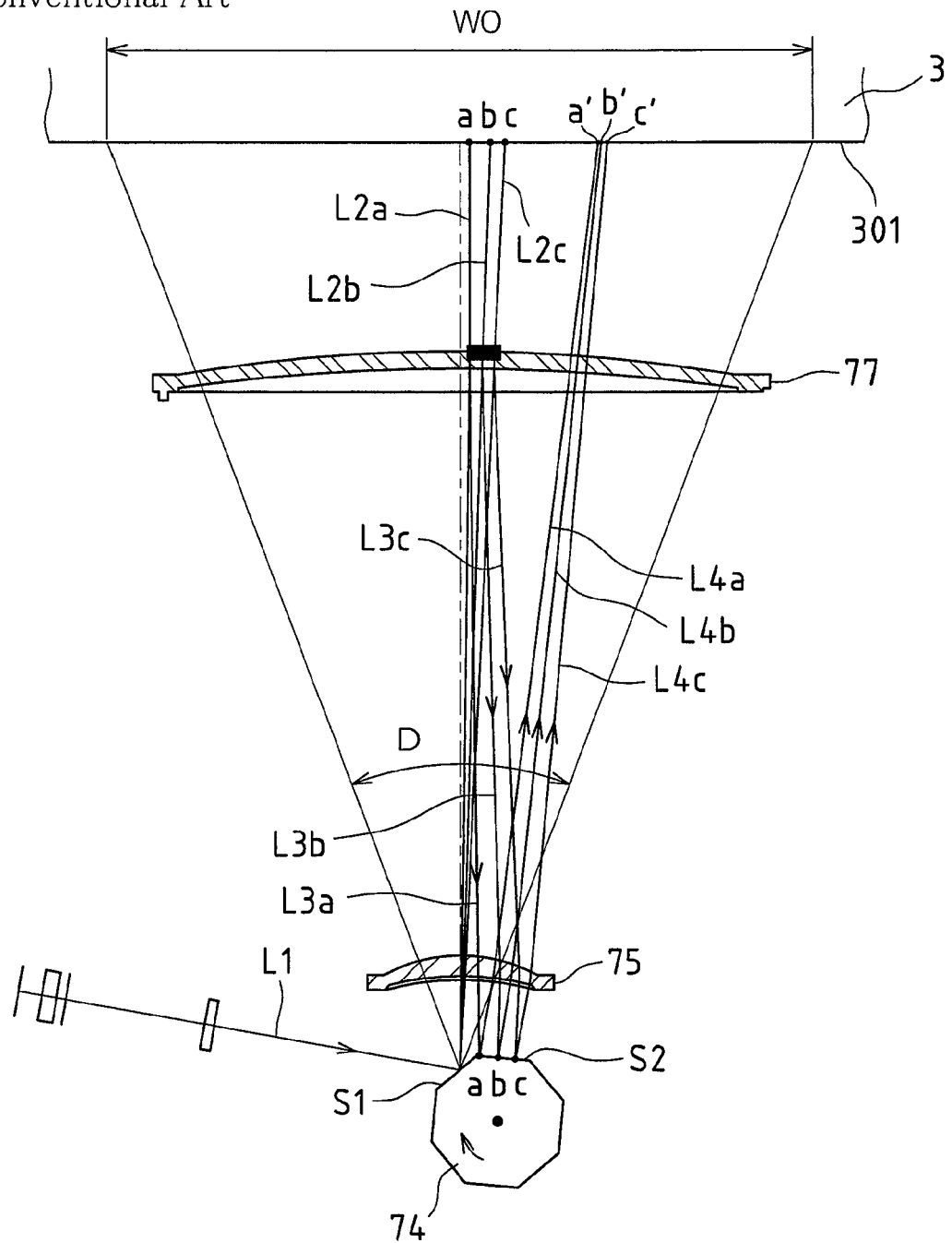
FIG. 12 illustrates the relationship between the incident laser beam, the reflected laser beam, and the stray light in an optical path from the 8-faced polygon mirror via lenses to a photosensitive body surface.

More specifically, as shown in FIG. 10, a light blocking member 80A of this embodiment is configured with a light blocking plate 81 having an opposing face 84 that faces a reflective face S of a polygon mirror 74, and a support plate 82 that supportably fixes the light blocking plate 81 to an inside roof face 91 of the cover member 90. The shape and dimensions of the light blocking plate 81, and disposed position relative to the polygon mirror 74, is completely the same as in above Embodiment 1. Also, the shape, dimensions, and so forth of the support plate 82 are approximately the same as in above Embodiment 1.

By adopting a structure in which, in this way, the light blocking member 80A is supportably fixed from above the polygon mirror 74, it is possible to open the entire space below the light blocking member 80A, and so it is possible to release the downward airflow that occurs due to high speed rotation of the polygon mirror 74, without any obstruction of that airflow at all. Thus, it is possible to further reduce the occurrence of vibration noise due to vibration of the light blocking member 80A. Furthermore, by forming the light blocking member 80A as a single body with the cover member 90, it is possible to reduce the number of components, and also possible to reduce manufacturing costs.

It is an object of the present invention for the light blocking member to prevent the incidence of stray light on the polygon mirror 74, but as another mode of use, the present invention can also be used with a light blocking member disposed so as to block the light of a scanning laser beam that has been reflected by the polygon mirror 74 such that the scanning laser beam does not protrude from the effective scanning region of the photosensitive body surface. By blocking light such that the scanning laser beam does not protrude from the effective scanning region of the photosensitive body surface in this way, because there is no light exposure outside of the effective scanning region of the photosensitive body surface, it is not necessary to increase the range of cleaning performed by the cleaner apparatus 4 thereafter, and to that extent it is possible to reduce the size of the cleaner apparatus 4, for example.

The present invention may be embodied in various other forms without departing from the gist or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An optical scanning apparatus, comprising:
   a light source that irradiates a laser beam;
   a rotating polygon mirror that deflects and scans a laser beam from the light source; and
   a light blocking member that is disposed facing a reflective face of the rotating polygon mirror, and blocks other light without blocking light in an effective scanning range of the laser beam;
   wherein an opposing face of the light blocking member that faces the reflective face of the rotating polygon mirror is inclined,
   wherein when a support member side where the rotating polygon mirror is rotatably attached and supported is defined as a lower side, and a side where the rotating polygon mirror is disposed relative to this support member is defined as an upper side,
   the opposing face of the light blocking member inclines downward from an upper edge of the opposing face nearest to the reflective face of the rotating polygon mirror so that the distance from the reflective face becomes wider downward.

2. The optical scanning apparatus according to claim 1, wherein the light blocking member comprises:
   a light blocking plate having the opposing face;
   a support plate that supports the light blocking plate; and
   a fixing plate that fixes a lower edge portion of the support plate to the support member;
   the space below the light blocking plate being open due to the light blocking plate being supported in a cantilever manner by the support plate.

3. The optical scanning apparatus according to claim 2, wherein the support plate of the light blocking member is provided at a position that is offset in the rotational direction relative to a parallel axis that passes through a rotational center of the rotating polygon mirror and is parallel to a laser irradiation direction when irradiating a laser beam to the center in a main scanning direction of a photosensitive body surface.

4. The optical scanning apparatus according to claim 2, wherein a back face of the opposing face of the light blocking plate is also inclined.

5. The optical scanning apparatus according to claim 2, wherein a lateral edge portion of the light blocking plate, the lateral edge portion being a receiving side of airflow that occurs due to rotation of the rotating polygon mirror, is thinly formed so as to reduce resistance of that airflow.

6. The optical scanning apparatus according to claim 1, further comprising a cover member that covers the entire rotating polygon mirror from above;
   wherein the light blocking member comprises:
   a light blocking plate having the opposing face; and
   a support plate that supportably fixes the light blocking plate to the cover member.

7. The optical scanning apparatus according to claim 1, wherein the light blocking member is formed from a material that does not plastically deform due to external force.

8. The optical scanning apparatus according to claim 1, wherein the light blocking member is formed from a material of a color having low reflectivity.

9. The optical scanning apparatus according to claim 1, wherein a face on the opposite side as the opposing face of the light blocking member has a surface roughness that disperses the laser beam.

10. An image forming apparatus, comprising the optical scanning apparatus according to claim 1.

* * * * *